United States Patent
Sekiguchi et al.

(10) Patent No.: US 7,008,569 B2
(45) Date of Patent: Mar. 7, 2006

(54) THERMOPLASTIC NORBORNENE RESIN BASED OPTICAL FILM

(75) Inventors: Masayuki Sekiguchi, Ichihara (JP); Yasuhiro Sakakura, Ichihara (JP); Hiraku Shibata, Ichihara (JP)

(73) Assignee: JSR Corporation, Tokyo (JP)

(*) Notice: Subject to any disclaimer, the term of this patent is extended or adjusted under 35 U.S.C. 154(b) by 231 days.

(21) Appl. No.: 10/433,611

(22) PCT Filed: Apr. 30, 2002

(86) PCT No.: PCT/JP02/04336

§ 371 (c)(1), (2), (4) Date: Jun. 17, 2003

(87) PCT Pub. No.: WO02/088784

PCT Pub. Date: Nov. 7, 2002

(65) Prior Publication Data
US 2004/0057141 A1 Mar. 25, 2004

(30) Foreign Application Priority Data

| Apr. 27, 2001 | (JP) | 2001-133206 |
| Dec. 14, 2001 | (JP) | 2001-382071 |
| Feb. 12, 2002 | (JP) | 2002-033961 |

(51) Int. Cl.
G02B 5/23 (2006.01)
G02B 5/30 (2006.01)
G02F 1/01 (2006.01)

(52) U.S. Cl. .................. 252/586; 252/585; 359/240; 428/1.31

(58) Field of Classification Search ........... 252/585, 252/586; 359/883
See application file for complete search history.

(56) References Cited

U.S. PATENT DOCUMENTS

| 5,178,955 | A | * | 1/1993 | Aharoni et al. ............ 428/421 |
| 5,516,456 | A | * | 5/1996 | Shinohara et al. ...... 252/299.01 |
| 5,611,985 | A | * | 3/1997 | Kobayashi et al. ......... 264/291 |
| 6,063,886 | A | * | 5/2000 | Yamaguchi et al. ........ 526/282 |
| 6,232,413 | B1 | * | 5/2001 | Starzewski et al. ......... 526/134 |
| 6,447,868 | B1 | | 9/2002 | Sekiguchi et al. |
| 6,552,145 | B1 | | 4/2003 | Okada et al. |

FOREIGN PATENT DOCUMENTS

| DE | WO 98/01483 | * | 1/1998 |
| EP | 0 587 890 | | 3/1994 |
| EP | 0 827 975 | | 3/1998 |
| EP | 0 916 989 | | 5/1999 |
| JP | 5-279554 | | 1/1993 |
| JP | 9-324036 | | 12/1997 |
| JP | 2000-219752 | * | 8/2000 |
| JP | 2001 074915 | | 3/2001 |

OTHER PUBLICATIONS

U.S. Appl. No. 10/491,433, filed Apr. 12, 2004, inventor Sekiguchi et al.

* cited by examiner

Primary Examiner—Randy Gulakowski
Assistant Examiner—Timothy J. Kugel
(74) Attorney, Agent, or Firm—Oblon, Spivak, McClelland, Maier & Neustadt, P.C.

(57) ABSTRACT

Optical films are provided for which the retardation generated, and the wavelength dispersion of that retardation, are able to be controlled. (1) An optical film containing a thermoplastic norbornene resin with a photoelastic coefficient ($C_P$) within a range from 0 to 100 ($\times 10^{-12}$ Pa$^{-1}$), and a stress optical coefficient ($C_R$) within a range from 1500 to 4000 ($\times 10^{-12}$ Pa$^{-1}$). (2) An optical film containing a thermoplastic norbornene resin either with a group represented by the general formula (2), shown below, or with at least one group selected from the general formulas (3) and (4) shown below. —(CH$_2$)$_p$—O—C(O)—R$^5$

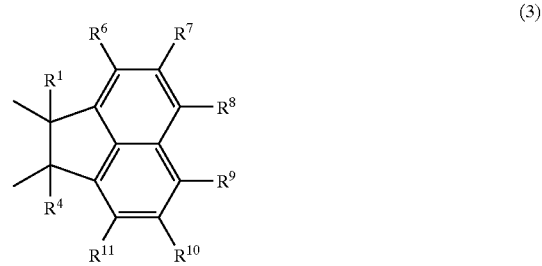

(3)

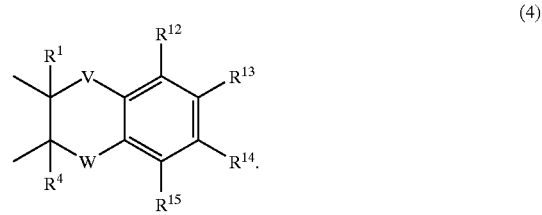

(4)

17 Claims, 1 Drawing Sheet

THERMOPLASTIC NORBORNENE RESIN BASED OPTICAL FILM

TECHNICAL FIELD

The present invention relates to an optical film comprising a thermoplastic norbornene resin as a primary constituent. By subjecting the film to a stretching process, a function enabling a retardation to be applied to transmitted light can be easily imparted to the film. This retardation imparting function displays excellent durability and stability. The film has excellent adhesion and bonding to other materials, is highly transparent, and also displays superior heat resistance. In addition, the present invention also relates to optical films with functions of retardation, light diffusion, transparent conductivity and reflection prevention.

BACKGROUND ART

Polycarbonate and polyester films, which have conventionally been used as optical films can be easily provided with a function for imparting a retardation to transmitted light by stretching of the film. Although dependent on the final use of the film, in almost cases, this retardation imparting function was satisfactory. However, because the anisotropy of the refractive index is overly large, in other words, the values of the photoelastic coefficient ($C_P$) and the stress optical coefficient ($C_R$) are overly large, minor variations in stress can cause a large variation in the transmitted light retardation imparting function. Consequently, this retardation imparting function has suffered from problems of reliability and poor stability over time.

In the case of films of triacetylacetate, the anisotropy of the refractive index is comparatively smaller, but these films suffer from problems relating to heat resistance, and deformation on water absorption.

Cyclic polyolefin based resins have properties which include a high glass transition temperature due to the rigidity of the primary chain structure, a non-crystalline structure with a high light transmittance due to the presence of bulky groups on the primary chain structure, and a low birefringence due to the small anisotropy of the refractive index, and are consequently drawing considerable attention as transparent thermoplastic resins with superior heat resistance, transparency and optical characteristics. Examples of this type of cyclic polyolefin based resin are disclosed in Japanese Laid-open publication (kokai) No. 1-132625 (JP1-132625A), Japanese Laid-open publication (kokai) No. 1-132626 (JP1-132626A), Japanese Laid-open publication (kokai) No. 63-218726 (JP63-218726A), Japanese Laid-open publication (kokai) No. 2-133413 (JP2-133413A), Japanese Laid-open publication (kokai) No. 61-120816 (JP61-120816A), and Japanese Laid-open publication (kokai) No. 61-115912 (JP61-115912A).

In recent years, the utilization of the above properties in the application of cyclic polyolefin based resins to optical materials such as optical films, optical disks, optical lenses and optical fibers and the like, as well as to fields such as sealing materials for optical semiconductor sealing has been the subject of much investigation. In other words, the application of films formed from cyclic polyolefin based resins to a variety of different film applications have been reported as potential solutions to the aforementioned problems associated with conventional optical films. Specific examples include the retardation plates formed from cyclic polyolefin based resin films disclosed in Japanese Laid-open publication (kokai) No. 4-245202 (JP4-245202A), Japanese Laid-open publication (kokai) No. 4-36120 (JP4-36120A), Japanese Laid-open publication (kokai) No. 5-2108 (JP5-2108A) and Japanese Laid-open publication (kokai) No. 5-64865 (JP5-64865A). The application of cyclic polyolefin based resin films to protective films for polarizing plates is disclosed in Japanese Laid-open publication (kokai) No. 5-212828 (JP5-212828A), Japanese Laid-open publication (kokai) No. 6-51117 (JP6-51117A) and Japanese Laid-open publication (kokai) No. 7-77608 (JP7-77608A). Moreover, a liquid crystal display element substrate formed from a cyclic polyolefin based resin film is disclosed in Japanese Laid-open publication (kokai) No. 5-61026 (JP5-61026A).

In the applications described above, the fact that a cyclic polyolefin based resin with a water absorption of no more than 0.05% can be produced with relative ease, and this low water absorption value are reported as the special characteristics of the resins, and are described as essential properties. However, if this type of low water absorption cyclic polyolefin based resin film is used as a retardation plate or a liquid crystal display element substrate, then the film may suffer from inferior adhesion to a hard coat, an antireflective film or a transparent conductive layer, or inferior bonding with the polarizing plate and the glass. In cases in which a cyclic polyolefin based resin film is used as a protective film for a polarizing plate, then in addition to the adhesion problems outlined above, an additional problem arises in that the water of the water based adhesive typically used for bonding the film to the polarizer is very difficult to dry.

However, the cyclic polyolefin based resin family includes a wide range of different structures, and not all cyclic polyolefin based resins display a water absorption of 0.05% or less. In order to ensure a water absorption of no more than 0.05%, the cyclic polyolefin based resin must have either a polyolefin structure formed from only carbon atoms and hydrogen atoms, or a structure which incorporates a proportion of halogen atoms.

Consequently, in order to resolve the aforementioned problems relating to low water absorption, optical films incorporating a thermoplastic norbornene resin with a polar group incorporated within the molecular structure have been disclosed in Japanese Laid-open publication (kokai) No. 7-287122 (JP7-287122A) and Japanese Laid-open publication (kokai) No. 7-287123 (JP7-287123A). The optical films disclosed in these applications display superior optical characteristics including a high degree of transparency, a low retardation of transmitted light, and a uniform and stable application of retardation to transmitted light upon stretching and orientation, offer good levels of heat resistance and adhesion and bonding with other materials, and moreover also undergo little deformation on water absorption.

However, these conventional cyclic polyolefin based resins have a refractive index anisotropy which is overly small, in other words, the values of the photoelastic coefficient ($C_P$) and the stress optical coefficient ($C_R$) are too small, and so when an attempt is made to equip an optical film incorporating this type of cyclic polyolefin based resin with a function for imparting a retardation to transmitted light, there are restrictions on the conditions for stretching and orienting the film, and the transmitted light retardation imparting function may be insufficient. In other words, because obtaining transmitted light with a large retardation is difficult, then depending on the final use of the film, the function for imparting retardation to transmitted light may be insufficient.

DISCLOSURE OF INVENTION

An object of the present invention is to provide an optical film incorporating, as a main constituent, a cyclic polyolefin based resin (thermoplastic norbornene resin) which retains the superior characteristics of a film comprising a conventional cyclic polyolefin based resin, namely, a high degree of transparency, a function for imparting a uniform and stable retardation to transmitted light when subjected to stretching and orientation, superior heat resistance together with good adhesion and bonding to other materials, and little deformation on water absorption, and yet also displays a suitable level of refractive index anisotropy which enables stretching and orientation processing to be performed easily, and enables transmitted light with a large retardation to be achieved.

In order to achieve the above object, a first aspect of the present invention provides an optical film incorporating a thermoplastic norbornene resin with a photoelastic coefficient ($C_P$) within a range from 0 to 100 ($\times 10^{-12}$ Pa$^{-1}$), and a stress optical coefficient ($C_R$) within a range from 1500 to 4000 ($\times 10^{-12}$ Pa$^{-1}$).

A second aspect of the present invention provides an optical film comprising at least one resin-layer comprising a thermoplastic norbornene resin formed of a polymer comprising:

a structural unit a represented by a general formula (1) shown below,

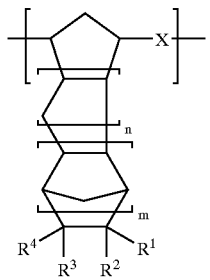

(1)

wherein, n represents either one of 0 and 1, m represents either one of 0, and an integer of at least 1;

X represents either one of a group represented by a formula —CH═CH— and a group represented by a formula —CH$_2$CH$_2$—;

$R^1$, $R^2$, $R^3$, and $R^4$ each represent, independently, any one of a hydrogen atom, a halogen atom, a substituted or unsubstituted hydrocarbon group of 1 to 30 carbon atoms which may contain a linkage group incorporating an oxygen atom, a nitrogen atom, a sulfur atom or a silicon atom, and a polar group; or $R^1$ and $R^2$, or $R^3$ and $R^4$, or $R^2$ and $R^3$ may be bonded to each other to form a hydrocarbon ring or a heterocyclic ring (wherein said hydrocarbon ring or said heterocyclic ring may be either one of a separate stand-alone structure, or a polycyclic structure formed through condensation with another ring, and said formed hydrocarbon ring or said heterocyclic ring may be an aromatic ring or a non-aromatic ring), wherein within at least a portion of said structural units a incorporated within said polymer, either at least one of said groups $R^1$ to $R^4$ has a group represented by a general formula (2) shown below, or said groups $R^2$ and $R^3$ are bonded to each other to form at least one group selected from general formulas (3) and (4) shown below:

(2)

wherein, p represents an integer of 1 to 5, and $R^5$ represents any one of a biphenylyl group, a naphthyl group (α or β), an anthracenyl group, and one of these groups in which a hydrogen atom has been substituted with a halogen atom or a hydrocarbon group of 1 to 10 carbon atoms,

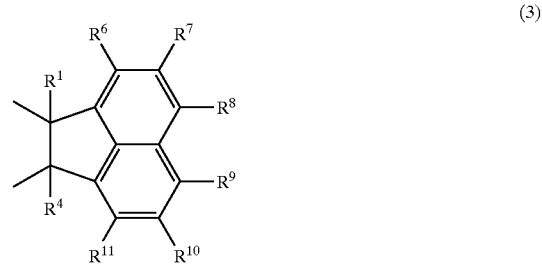

(3)

wherein, $R^1$ and $R^4$ represent identical meanings as defined above in relation to said general formula (1), and $R^6$ to $R^{11}$ each represent, independently, any one of a hydrogen atom; a halogen atom; a substituted or unsubstituted monovalent hydrocarbon group of 1 to 10 carbon atoms which may contain a linkage group incorporating an oxygen atom, a nitrogen atom, a sulfur atom or a silicon atom; and a monovalent polar group, and

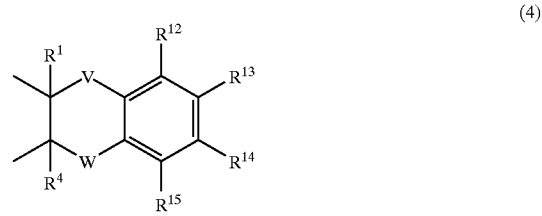

(4)

wherein, $R^1$ and $R^4$ represent identical meanings as defined above, and $R^{12}$ to $R^{15}$ each represent, independently, any one of a hydrogen atom; a halogen atom; a substituted or unsubstituted monovalent hydrocarbon group of 1 to 10 carbon atoms which may contain a linkage group incorporating an oxygen atom, a nitrogen atom, a sulfur atom or a silicon atom; and a monovalent polar group. V and W each represent, independently, either one of a single bond, and a bivalent group selected from a group consisting of —O—, —CO—, —NR—, —(CR$^{17}$R$^{18}$)$_q$—(wherein q=1 to 5), —COO— and —OCO—, and $R^{16}$ to $R^{18}$ each represent, independently, any one of a hydrogen atom, a halogen atom, and an aliphatic hydrocarbon group, an alicyclic hydrocarbon group and an aromatic hydrocarbon group of 1 to 10 carbon atoms, a plurality of X's present in a molecule of said copolymer being the same or different.

In addition, the present invention also provides a production method for the immediately aforementioned optical film comprising a step for casting an organic solvent solution incorporating the aforementioned thermoplastic norbornene resin.

In addition, the present invention also provides an aforementioned optical film which imparts a retardation to transmitted light.

In addition, the present invention also provides an aforementioned optical film with a light diffusing function on at least one surface thereof.

In addition, the present invention also provides an aforementioned optical film with a transparent conductive layer on at least one surface thereof.

In addition, the present invention also provides an aforementioned optical film with an antireflective layer on at least one surface thereof.

In addition, the present invention also provides a polarizing plate protective film formed from an aforementioned optical film.

In addition, the present invention also provides a polarizing plate comprising an aforementioned optical film. Specifically, as embodiments a polarizing plate comprising the optical film as protective film formed on at least one surface of the substrate, or as the substrate.

BEST MODE FOR CARRYING OUT THE INVENTION

Figure 1:
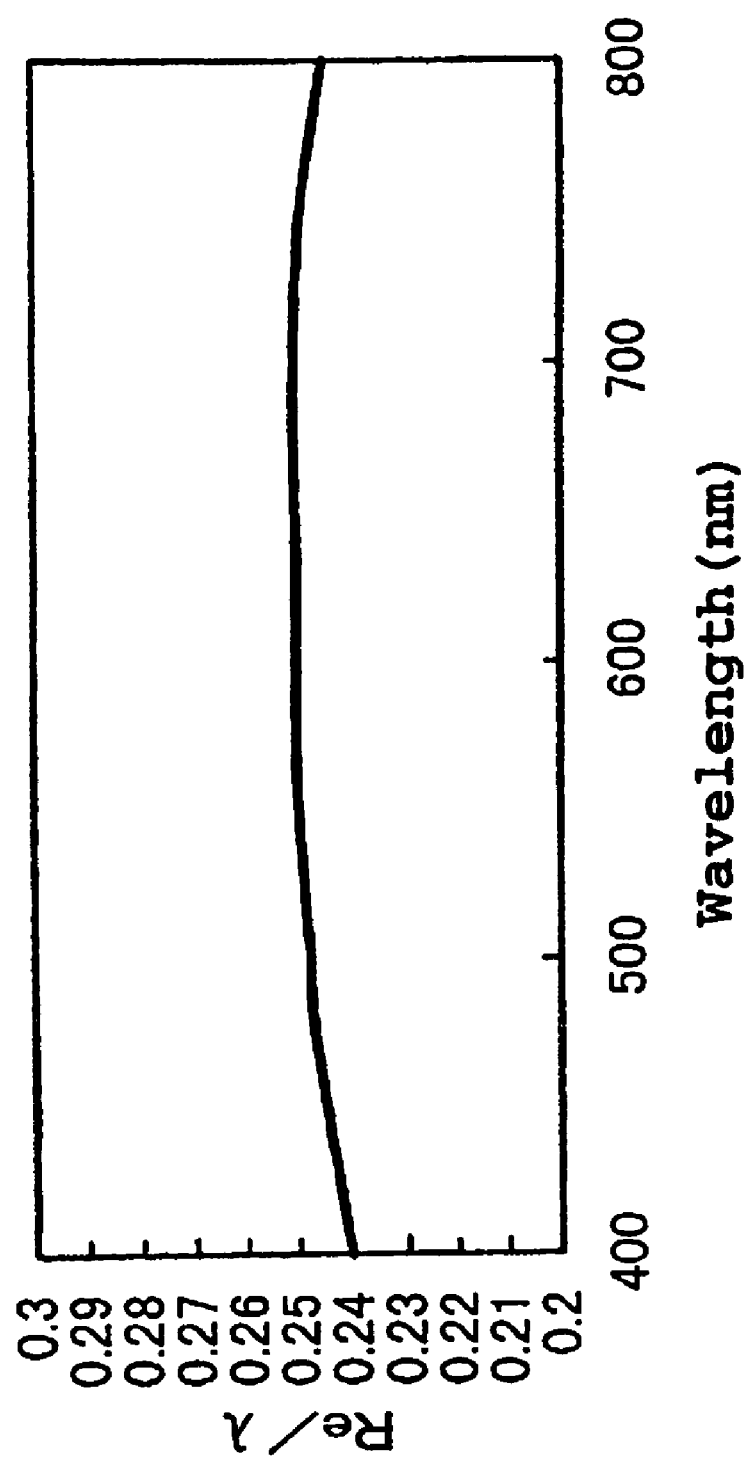
FIG. 1 is a graph showing the wavelength dependency of the retardation applied to transmitted light by a retardation plate obtained by laminating and bonding the retardation films (a-3) and (a-4) produced in an example 1, in other words, the results of measuring the relationship $Re(\lambda)\lambda$ between the wavelength $\lambda$ of transmitted light within a wavelength range from 400 to 800 nm, and the retardation value $Re(\lambda)$ of transmitted light of wavelength $\lambda$ (the term $Re(\lambda)$ is abbreviated to Re in the figure).

As follows is a more detailed description of the present invention. The term "retardation" herein means the retardation of an optical phase of a light that occurs when the light is transmitted through an object. This terminology is found in many references for example, IDW (International Display Workshop) '00, pages 407–418.

First Aspect of the Invention

[Optical Film (1)]

In an optical film according to the present invention incorporating a thermoplastic norbornene resin with a photoelastic coefficient ($C_P$) within a range from 0 to 100 ($\times 10^{-12}$ Pa$^{-1}$), and a stress optical coefficient ($C_R$) within a range from 1500 to 4000 ($\times 10^{-12}$ Pa$^{-1}$), the aforementioned specific thermoplastic norbornene resin must constitute at least 70% by weight, and preferably at least 80% by weight, and even more preferably at least 85% by weight of the optical film of the present invention. If the proportion of the aforementioned specific thermoplastic norbornene resin is less than 70% by weight, then the effects of the present invention may not be achievable, and for example, the function for imparting a retardation to transmitted light produced by stretching and orienting the film may be unsatisfactory.

As follows is a brief description of the photoelastic coefficient ($C_P$) and the stress optical coefficient ($C_R$). These coefficients are reported in various documents (Polymer Journal: Vol. 27, No. 9, pp 943–950 (1995), Journal of the Society of Rheology, Japan: Vol. 19, No. 2, pp 93–97 (1991), and "Elasticity Test Methods" published by Nikkan Kogyo Shimbun Ltd., seventh edition, (1975)). The photoelastic coefficient ($C_P$) is the ratio of the birefringence to the stress for solid, namely, $C_P$ represents the degree of retardation imparted to transmitted light as a result of stress for a polymer in a glass state. The stress optical coefficient ($C_R$) characterizes the birefringence in the liquid and rubbery zone, namely $C_R$ represents the degree of retardation imparted to transmitted light as a result of stress for a polymer in a fluid and rubbery state.

A large photoelastic coefficient ($C_P$) means that when the polymer is used in a glass state, the retardation of transmitted light will vary with a great deal of sensitivity relative to either external stress, or internal stress due to factors such as frozen distortions. In other words, minor stresses generated by residual distortions produced when an optical film is bonded to a polarizing plate or a glass plate prior to use, or by material contraction arising from variations in temperature or humidity, may cause the retardation of transmitted light to undergo considerable variation.

In the case of a large stress optical coefficient ($C_R$), when a transmitted light retardation imparting function is provided on an optical film, the desired degree of retardation imparting function can be achieved with a relatively small stretching magnification, and a film which imparts a large retardation to transmitted light can be produced relatively easily. In order to produce a film with the same level of retardation but with a smaller stress optical coefficient ($C_R$), the thickness of the film needs to be reduced.

For the above reasons, an optical film of the present invention must incorporate a thermoplastic norbornene resin with a photoelastic coefficient ($C_P$) within a range from 0 to 100 ($\times 10^{-12}$ Pa$^{-1}$), and preferably from 0 to 80 ($\times 10^{-12}$ Pa$^{-1}$), and even more preferably from 0 to 50 ($\times 10^{-12}$ Pa$^{-1}$), and even more preferably from 0 to 30 ($\times 10^{-12}$ Pa$^{-1}$), and most preferably from 0 to 20 ($\times 10^{-12}$ Pa$^{-1}$), and moreover with a stress optical coefficient ($C_R$) within a range from 1500 to 4000 ($\times 10^{-12}$ Pa$^{-1}$), and preferably from 1700 to 4000 ($\times 10^{-12}$ Pa$^{-1}$), and even more preferably from 1900 to 4000 ($\times 10^{-12}$ Pa$^{-1}$), and even more preferably from 2100 to 4000 ($\times 10^{-12}$ Pa$^{-1}$), and most preferably from 2300 to 4000 ($\times 10^{-12}$ Pa$^{-1}$).

If the photoelastic coefficient ($C_P$) exceeds 100 ($\times 10^{-12}$ Pa$^{-1}$), then when the optical film is bonded to a polarizing plate or glass prior to use, the retardation will vary with variations in the environment, and color irregularities may also develop, both of which are undesirable.

In contrast, if the stress optical coefficient ($C_R$) is less than 1500 ($\times 10^{-12}$ Pa$^{-1}$), there can be a limit to the transmitted light retardation imparting function produced by stretching and orientation of the film, whereas if the stress optical coefficient exceeds 4000 ($\times 10^{-12}$ Pa$^{-1}$), then the retardation of light which has passed through a stretched and oriented optical film is more likely to suffer from irregularities across the film surface, both of which are undesirable.

Second Aspect of the Invention

[Optical Film (2)]

<Thermoplastic Norbornene Resin>

A polymer used for an optical film (2) of the present invention, namely, a thermoplastic norbornene resin (hereafter this resin may be described as a "resin of the present invention") incorporates as an essential structial unit, a structural unit represented by the general formula (1) shown below comprising at least one group selected from the general formulas (2) to (4) shown below, although the resin may also incorporate other structural units as required.

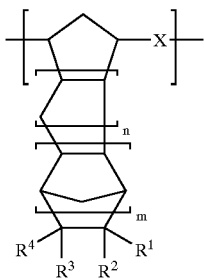                               (1)

wherein, n, m, X and $R^1$ and $R^4$ represent the same meanings as defined above

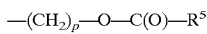

wherein, p and $R^5$ represent the same meanings as defined above

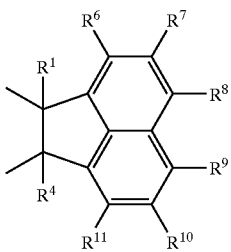                               (3)

wherein, $R^1$, $R^4$, and $R^6$ to $R^{11}$ represent the same meanings as defined above

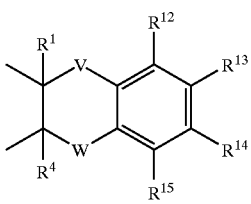                               (4)

wherein, $R^1$, $R^4$, $R^{12}$ to $R^{15}$, V and W represent the same meanings as defined above.

In the general formulas (1) to (4), $R^1$ to $R^4$ represent a hydrogen atom; a halogen atom; a substituted or unsubstituted hydrocarbon group of 1 to 30 carbon atoms which may contain a linkage group incorporating an oxygen atom, a nitrogen atom, a sulfur atom or a silicon atom; or a polar group. As follows is a more detailed description of these atoms and groups.

Examples of suitable halogen atoms include fluorine atoms, chlorine atoms and bromine atoms.

Examples of suitable hydrocarbon groups of 1 to 30 carbon atoms include alkyl groups such as methyl groups, ethyl groups and propyl groups; cycloalkyl groups such as cyclopentyl groups and cyclohexyl groups; alkenyl groups such as vinyl groups, allyl groups and propenyl groups; and aromatic groups such as phenyl groups, naphthyl groups and anthracenyl groups. These hydrocarbon groups may be substituted, and suitable substituent groups include halogen atoms such as fluorine, chlorine and bromine, or phenylsulfonyl groups.

The aforementioned substituted or unsubstituted hydrocarbon groups may be either bonded directly to the cyclic structure, or bonded via a linkage group. Examples of suitable linkage groups include bivalent hydrocarbon groups of 1 to 10 carbon atoms (such as alkylene groups represented by —$(CH_2)_m$— (wherein m is an integer of 1 to 10)); and linkage groups incorporating an oxygen atom, a nitrogen atom, a sulfur atom or a silicon atom (such as carbonyl groups (—CO—), carbonyloxy groups (—COO)—, oxycarbonyl groups (—OCO—), sulfonyl groups (—$SO_2$—), ether linkages (—O—), thioether linkages (—S—), imino groups (—NH—), amide linkages (—NHCO—, —CONH—), and siloxane linkages (—OSi($R_2$)— (wherein R represents an alkyl group such as a methyl group or an ethyl group), and linkage groups incorporating a plurality of these linkages are also possible.

Examples of suitable polar groups include hydroxy groups, and alkoxy groups of 1 to 10 carbon atoms, acyloxy groups of 1 to 10 carbon atoms, alkoxycarbonyl groups of 1 to 10 carbon atoms, aryloxycarbonyl groups of 1 to 10 carbon atoms, cyano groups, amide groups, imide ring containing groups, triorganosiloxy groups, triorganosilyl groups, amino groups, acyl groups, alkoxysilyl groups, sulfonyl containing groups and carboxyl groups. Specific examples include alkoxy groups such as methoxy groups and ethoxy groups; acyloxy groups including alkylcarbonyloxy groups such as acetoxy groups and propionyloxy groups, as well as arylcarbonyloxy groups such as benzoyloxy groups; alkoxycarbonyl groups such as methoxycarbonyl groups and ethoxycarbonyl groups; aryloxycarbonyl groups such as phenoxycarbonyl groups, naphthyloxycarbonyl groups, fluorenyloxycarbonyl groups and biphenylyloxycarbonyl groups; triorganosiloxy groups such as trimethylsiloxy groups and triethylsiloxy groups; triorganosilyl groups such as trimethylsilyl groups and triethylsilyl groups; amino groups such as primary amino groups; and alkoxysilyl groups such as trimethoxysilyl groups and triethoxysilyl groups.

The polymer is produced by polymerizing a monomer mixture incorporating at least one monomer selected from the monomers represented by the general formulas (5), (6) and (7) shown below (hereafter, a monomer represented by the general formula (5) is referred to as a specific monomer A, a monomer represented by the general formula (6) is referred to as a specific monomer B, and a monomer represented by the general formula (7) is referred to as a specific monomer C).

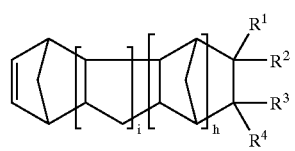                               (5)

wherein, $R^1$ to $R^4$ represent the same meanings as defined above in relation to the general formula (1), although at least one of the groups $R^1$ to $R^4$ is a group represented by the general formula (2) shown above, and the structures represented by the general formula (3) and the general formula (4)

above are excluded. In addition, h represents either 0 or a positive integer, and i represents either 0 or 1.

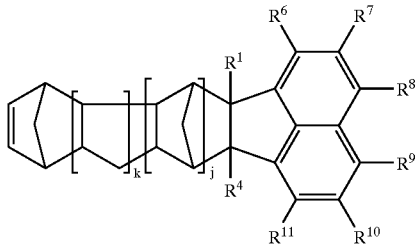

(6)

wherein, $R^1$, $R^4$ and $R^6$ to $R^{11}$ represent the same meanings as defined above in relation to the general formula (2), j represents either 0 or a positive integer, and k represents either 0 or 1.

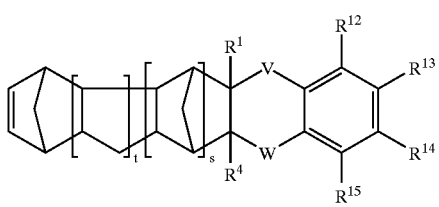

(7)

wherein, $R^1$, $R^4$, $R^{12}$ to $R^{15}$, V and W represent the same meanings as defined above in relation to the general formula (3), s represents either 0 or a positive integer, and t represents either 0 or 1.

In a resin of the present invention, the proportion of the essential structural unit should be from 100 to 5% by weight, and preferably from 100 to 10% by weight, and even more preferably from 100 to 20% by weight. If the essential structural unit content is less than 5% by weight, then the stretching orientation required to produce an optical film capable of imparting the desired level of retardation to transmitted light can prove difficult to achieve.

Other structural units, in addition to the essential structural unit described above, may also be incorporated in a resin of the present invention. Examples of other suitable structural units include those structural units a represented by the general formula (1) but excluding the essential structural unit. A resin of the present invention incorporating such structural units can be produced by copolymerization of a monomer represented by a general formula (8) shown below (hereafter referred to as the specific monomer D) and at least one monomer selected from the group consisting of the aforementioned specific monomers A, B and C.

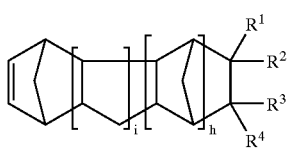

(8)

wherein, h, i, $R^1$, $R^2$, $R^3$ and $R^4$ represent the same meanings as defined above in relation to the general formulas (1) and (5), although the monomers represented by the general formulas (5) to (7) are excluded.

More specific examples of resins of the present invention include the polymers (1) to (4) shown below.

(1) Ring opening polymers of at least one monomer selected from the group consisting of the specific monomers A, B and C
(2) Ring opening copolymers of at least one monomer selected from the group consisting of the specific monomers A, B and C, together with the specific monomer D
(3) Ring opening copolymers of at least one monomer selected from the group consisting of the specific monomers A, B and C, together with a copolymerizable monomer other than the specific monomer D, or alternatively, ring opening copolymers of at least one monomer selected from the group consisting of the specific monomers A, B and C, together with the specific monomer D and another copolymerizable monomer other than the specific monomer D
(4) Hydrogenated products of the ring opening polymers and ring opening copolymers of (1), (2), or (3) above The specific monomer A, the specific monomer B, the specific monomer C and the specific monomer D will be described in further detail below, but none of these monomers is restricted to the examples presented.

<Specific Monomer A>

Specific examples include:
5-(4-biphenylcarbonyloxymethyl)bicyclo[2.2.1]hept-2-ene,
5-(4-biphenylcarbonyloxyethyl)bicyclo[2.2.1]hept-2-ene,
5-(4-biphenylcarbonyloxypropyl)bicyclo[2.2.1]hept-2-ene,
5-methyl-5-(4-biphenylcarbonyloxymethyl)bicyclo[2.2.1]hept-2-ene,
5-(2-biphenylcarbonyloxymethyl)bicyclo[2.2.1]hept-2-ene,
5-(2-biphenylcarbonyloxyethyl)bicyclo[2.2.1]hept-2-ene,
5-methyl-5-(2-biphenylcarbonyloxymethyl)bicyclo[2.2.1]hept-2-ene,
5-(3-biphenylcarbonyloxymethyl)bicyclo[2.2.1]hept-2-ene,
5-(3-biphenylcarbonyloxyethyl)bicyclo[2.2.1]hept-2-ene,
5-(1-naphthylcarbonyloxymethyl)bicyclo[2.2.1]hept-2-ene,
5-(1-naphthylcarbonyloxyethyl)bicyclo[2.2.1]hept-2-ene,
5-methyl-5-(1-naphthylcarbonyloxymethyl)bicyclo[2.2.1]hept-2-ene,
5-(2-naphthylcarbonyloxymethyl)bicyclo[2.2.1]hept-2-ene,
5-(2-naphthylcarbonyloxyethyl)bicyclo[2.2.1]hept-2-ene,
5-methyl-5-(2-naphthylcarbonyloxymethyl)bicyclo[2.2.1]hept-2-ene,
5-(9-anthracenylcarbonyloxymethyl)bicyclo[2.2.1]hept-2-ene,
5-(9-anthracenylcarbonyloxyethyl)bicyclo[2.2.1]hept-2-ene,
5-methyl-5-(9-anthracenylcarbonyloxymethyl)bicyclo[2.2.1]hept-2-ene,
8-(4-biphenylcarbonyloxymethyl)tetracyclo[4.4.0.1$^{2,5}$.1$^{7,10}$]-3-dodecene,
8-(4-biphenylcarbonyloxyethyl)tetracyclo[4.4.0.1$^{2,5}$.1$^{7,10}$]-3-dodecene,
8-methyl-8-(4-biphenylcarbonyloxymethyl)tetracyclo[4.4.0.1$^{2,5}$.1$^{7,10}$]-3-dodecene,
8-(2-biphenylcarbonyloxymethyl)tetracyclo[4.4.0.1$^{2,5}$.1$^{7,10}$]-3-dodecene,
8-methyl-8-(2-biphenylcarbonyloxymethyl)tetracyclo[4.4.0.1$^{2,5}$.1$^{7,10}$]-3-dodecene,
8-(3-biphenylcarbonyloxymethyl)tetracyclo[4.4.0.1$^{2,5}$.1$^{7,10}$]-3-dodecene,
8-methyl-8-(3-biphenylcarbonyloxymethyl)tetracyclo[4.4.0.1$^{2,5}$.1$^{7,10}$]-3-dodecene, 8-(1-naphthylcarbonyloxymethyl)tetracyclo[4.4.0.1$^{2,5}$.1$^{7,10}$]-3-dodecene,
8-methyl-8-(1-naphthylcarbonyloxymethyl)tetracyclo[4.4.0.1$^{2,5}$.1$^{7,10}$]-3-dodecene,
8-(2-naphthylcarbonyloxymethyl)tetracyclo[4.4.0.1$^{2,5}$.1$^{7,10}$]-3-dodecene,
8-methyl-8-(2-naphthylcarbonyloxymethyl)tetracyclo[4.4.0.1$^{2,5}$.1$^{7,10}$]-3-dodecene,
8-(9-anthracenylcarbonyloxymethyl)tetracyclo[4.4.0.1$^{2,5}$.1$^{7,10}$]-3-dodecene, and
8-methyl-8-(9-anthracenylcarbonyloxymethyl)tetracyclo[4.4.0.1$^{2,5}$.1$^{7,10}$]-3-dodecene.

These monomers may be used singularly, or in combinations of two or more monomers.

<Specific Monomer B>

Specific examples include:
1,2-(2H,3H-[1,3]epicyclopenta)-1,2-dihydroacenaphthylene represented by the formula (a) shown below,

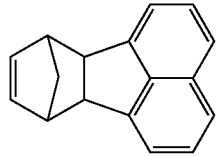

(a)

a Diels-Alder addition product of 1,2-(2H,3H-[1,3]epicyclopenta)-1,2-dihydroacenaphthylene and cyclopentadiene represented by the formula (b) shown below,

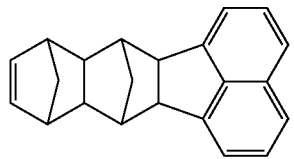

(b)

and substituted variants of the compounds above in which a hydrogen atom of one of the aromatic rings is substituted with a halogen atom or a hydrocarbon group of 1 to 10 carbon atoms. These monomers may also be used in combinations of two or more monomers.

<Specific Monomer C>

Specific examples include:
1,4-methano-1,4,4a,9a-tetrahydrofluorene,
1,4-methano-1,4,4a,9,9a,10-hexahydroanthracene,
1,4-methano-1,4,4a,9,10,10a-hexahydrophenanthrene,
11,12-benzo-pentacyclo[6.5.1.1$^{3,6}$.0$^{2,7}$.0$^{9,13}$]-4-pentadecene
11,12-benzo-pentacyclo[6.6.1.1$^{3,6}$.0$^{2,7}$.0$^{9,14}$]-4-hexadecene
1,4-methano-1,4,4a,9a-tetrahydrodibenzofuran,
1,4-methano-1,4,4a,9a-tetrahydrocarbazole, and
1,4-methano-1,4,4a,10a-tetrahydroanthraquinone.

These monomers may also be used in combinations of two or more monomers.

<Specific Monomer D>

Specific examples include:
bicyclo[2.2.1]hept-2-ene,
5-methylbicyclo[2.2.1]hept-2-ene,
5-ethylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-phenoxycarbonylbicyclo[2.2.1]hept-2-ene,
5-methyl-5-phenoxycarbonylbicyclo[2.2.1]hept-2-ene,
5-cyanobicyclo[2.2.1]hept-2-ene,
5-ethylidenebicyclo[2.2.1]hept-2-ene,
8-ethylidenetetracyclo[4.4.0.1$^{2,5}$.1$^{7,10}$]-3-dodecene,
5-phenylbicyclo[2.2.1]hept-2-ene,
5-(2-naphthyl)bicyclo[2.2.1]hept-2-ene (both α and β types are possible),
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(trifluoromethyl)bicyclo[2.2.1]hept-2-ene,
5,5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-6-trifluoromethylbicyclo[2.2.1]hept-2-ene,
5-fluoro-5-pentafluoroethyl-6,6-bis(trifluoromethyl)bicyclo[2.2.1]hept-2-ene,
5,6-difluoro-5-heptafluoro-iso-propyl-6-trifluoromethylbicyclo[2.2.1]hept-2-ene,
5-chloro-5,6,6-trifluorobicyclo[2.2.1]hept-2-ene,
5,6-dichloro-5,6-bis(trifluoromethyl)bicyclo[2.2.1]hept-2-ene,
5,5,6-trifluoro-6-trifluoromethoxybicyclo[2.2.1]hept-2-ene,
5,5,6-trifluoro-6-heptafluoropropoxybicyclo[2.2.1]hept-2-ene,
4-(bicyclo[2.2.1]hept-5-en-2-yl)phenylsulfonylbenzene,
tricyclo[5.2.1.0$^{2,6}$]-8-decene,
tetracyclo[4.4.0.1$^{2,5}$.1$^{7,10}$]-3-dodecene,
pentacyclo[6.5.1.1$^{3,6}$.0$^{2,7}$.0$^{9,13}$]-4-pentadecene,
pentacyclo[7.4.0.1$^{2,5}$.1$^{9,12}$.0$^{8,13}$]-3-pentadecene,
tricyclo[4.4.0.1$^{2,5}$]-3-undecene,
8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3-dodecene,
8-n-butoxycarbonyltetracyclo[4.4.0.1$^{2,5}$.1$^{7,10}$]-3-dodecene,
8-phenoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene,
8-methyl-8-phenoxycarbonyltetracyclo[4.4.0.1$^{2,5}$.1$^{7,10}$]-3-dodecene,
pentacyclo[8.4.0.1$^{2,5}$.1$^{9,12}$.0$^{8,13}$]-3-hexadecene,
heptacyclo[8.7.0.1$^{3,6}$.1$^{10,17}$.1$^{12,15}$.0$^{2,7}$.0$^{11,16}$]-4-eicosene,
heptacyclo[8.8.0.1$^{4,7}$.1$^{11,18}$.1$^{13,16}$.0$^{3,8}$.0$^{12,17}$]-5-heneicosene,
8-phenyltetracyclo[4.4.0.1$^{2,5}$.1$^{7,10}$]-3-dodecene, 8-methyl-8-phenyltetracyclo[4.4.0.1$^{2,5}$.1$^{7,10}$]-3-dodecene,
8-fluorotetracyclo[4.4.0.1$^{2,5}$.1$^{7,10}$]-3-dodecene,
8-fluoromethyltetracyclo[4.4.0.1$^{2,5}$.1$^{7,10}$]-3-dodecene,
8-difluoromethyltetracyclo[4.4.0.1$^{2,5}$.1$^{7,10}$]-3-dodecene,
8-trifluoromethyltetracyclo[4.4.0.1$^{2,5}$.1$^{7,10}$]-3-dodecene,
8-pentafluoroethyltetracyclo[4.4.0.1$^{2,5}$.1$^{7,10}$]-3-dodecene,
8,8-difluorotetracyclo[4.4.0.1$^{2,5}$.1$^{7,10}$]-3-dodecene,
8,9-difluorotetracyclo[4.4.0.1$^{2,5}$.1$^{7,10}$]-3-dodecene,
8,8-bis(trifluoromethyl)tetracyclo[4.4.0.1$^{2,5}$.1$^{7,10}$]-3-dodecene,
8,9-bis(trifluoromethyl)tetracyclo[4.4.0.1$^{2,5}$.1$^{7,10}$]-3-dodecene,
8-methyl-8-trifluoromethyltetracyclo[4.4.0.1$^{2,5}$.1$^{7,10}$]-3-dodecene,
8,8,9-trifluorotetracyclo[4.4.0.1$^{2,5}$.1$^{7,10}$]-3-dodecene,
8,8,9-tris(trifluoromethyl)tetracyclo[4.4.0.1$^{2,5}$.1$^{7,10}$]-3-dodecene,
8,8,9,9-tetrafluorotetracyclo[4.4.0.1$^{2,5}$.1$^{7,10}$]-3-dodecene,
8,8,9,9-tetrakis(trifluoromethyl)tetracyclo[4.4.0.1$^{2,5}$.1$^{7,10}$]-3-dodecene,
8,8-difluoro-9,9-bis(trifluoromethyl)tetracyclo[4.4.0.1$^{2,5}$.1$^{7,10}$]-3-dodecene,
8,9-difluoro-8,9-bis(trifluoromethyl)tetracyclo[4.4.0.1$^{2,5}$.1$^{7,10}$]-3-dodecene,
8,8,9-trifluoro-9-trifluoromethyltetracyclo[4.4.0.1$^{2,5}$.1$^{7,10}$]-3-dodecene,
8,8,9-trifluoro-9-trifluoromethoxytetracyclo[4.4.0.1$^{2,5}$.1$^{7,10}$]-3-dodecene,
8,8,9-trifluoro-9-pentafluoropropoxytetracyclo[4.4.0.1$^{2,5}$.1$^{7,10}$]-3-dodecene,
8-fluoro-8-pentafluoroethyl-9,9-bis(trifluoromethyl)tetracyclo[4.4.0.1$^{2,5}$.1$^{7,10}$]-3-dodecene,
8,9-difluoro-8-heptafluoroiso-propyl-9-trifluoromethyltetracyclo[4.4.0.1$^{2,5}$.1$^{7,10}$]-3-dodecene,
8-chloro-8,9,9-trifluorotetracyclo[4.4.0.1$^{2,5}$.1$^{7,10}$]-3-dodecene,
8,9-dichloro-8,9-bis(trifluoromethyl)tetracyclo[4.4.0.1$^{2,5}$.1$^{7,10}$]-3-dodecene,
8-(2,2,2-trifluoroethoxycarbonyl)tetracyclo[4.4.0.1$^{2,5}$.1$^{7,10}$]-3-dodecene, and
8-methyl-8-(2,2,2-trifluoroethoxycarbonyl)tetracyclo[4.4.0.1$^{2,5}$.1$^{7,10}$]-3-dodecene.

These monomers may be used singularly or in combinations of two or more monomers, and are combined with at least one monomer selected from the group consisting of the specific monomer A, the specific monomer B and the specific monomer C.

Of the above monomers, the specific monomer D in which h=1 and i=0 in the general formula (8) provides a good balance between heat resistance and toughness in the product polymer, and is consequently preferred. In other words, if a specific monomer D in which h is 2 or greater, or i is 1 or greater is used, then there is a tendency for the product polymer to have a high glass transition temperature (Tg), and for the heat resistance to improve, which may be preferable in some cases, but there is also a tendency for the toughness to deteriorate, meaning that there is an increased likelihood of a film produced from the polymer breaking or rupturing, either during use or during processing.

Specific monomers D which comprise at least one polar group within the molecule are also preferred. In other words, in the aforementioned general formula (8), monomers in which three of the groups $R^1$ to $R^4$ are either hydrogen atoms or hydrocarbon groups of 1 to 10 carbon atoms, and the remaining one group is a polar group other than a hydrocarbon group, display improved adhesion and bonding to other materials, and are consequently preferred.

In addition, a specific monomer D in which the polar group is a polar group represented by a general formula (9):

$$—(CH_2)_z COOR^{19} \qquad (9)$$

[wherein, z is typically from 0 to 5, and preferably from 0 to 2, and even more preferably 0, and $R^{19}$ is a monovalent organic group]

produces a polymer for which the glass transition temperature and the water absorption can be controlled relatively easily, and is consequently preferred. Examples of the monovalent organic group represented by $R^{19}$ in the general formula (9) include alkyl groups such as methyl groups, ethyl groups and propyl groups; aryl groups such as phenyl groups, naphthyl groups, anthracenyl groups, and biphenylyl groups; and other monovalent groups with an aromatic ring or a heterocyclic ring such as a furan ring or an imide ring, including fluorene compounds such as diphenylsulfone and tetrahydrofluorene. In the general formula (9), z is typically from 0 to 5, as described above, although monomers with smaller values of z are preferred as they give rise to product polymers with higher glass transition temperatures, and specific monomers D in which z is 0 are particularly preferred from the viewpoint of ease of synthesis.

In addition, in the aforementioned general formula (8), it is desirable that an alkyl group is also bonded to the carbon atom to which the polar group represented by the general formula (9) is bonded, as such a structure produces a product polymer with a good balance between heat resistance and water absorption. This alkyl group should preferably comprise from 1 to 5 carbon atoms, and preferably from 1 to 2 carbon atoms, and even more preferably 1 carbon atom.

From amongst the specific examples of the specific monomer D presented above, 8-methyl-8-methoxycarbonyltetracyclo[4.4.0.1$^{2,5}$.1$^{7,10}$]-3-dodecene is particularly preferred as it increases the glass transition temperature of a resin of the present invention, and furthermore a film produced from such a resin is able to maintain a level of water absorption which produces good adhesion and bonding to other materials, without suffering any deleterious deformation or the like upon water absorption.

There are no particular restrictions on the amount of the polar group within the product polymer, and this amount can be determined in accordance with the desired functions of the polymer, although typically the structural units a with the polar group should comprise at least 1 mol %, and preferably at least 5 mol %, and even more preferably at least 10 mol % of the total number of structural units. The situation in which all of the structural units have a polar group is also acceptable.

The introduction of the polar group into the structural unit a can be achieved by copolymerization using a specific monomer D with an aforementioned polar group, by copolymerization using a specific monomer A in which at least one of the groups $R^1$ to $R^4$ of the general formula (5) is a polar group, or by copolymerization using a specific monomer B or a specific monomer C in which at least one of $R^1$ or $R^4$ in the general formula (6) or the general formula (7) is a polar group.

<Other Copolymerizable Monomers>

Examples of other copolymerizable monomers which can be copolymerized with at least one monomer selected from the group consisting of the specific monomer A, the specific monomer B and the specific monomer C, and where necessary the specific monomer D, include cycloolefins such as cyclobutene, cyclopentene, cycloheptene, cyclooctene, tricyclo[5.2.1.0$^{2,6}$]-3-decene and dicyclopentadiene. The number of carbon atoms within these cycloolefins should preferably be from 4 to 20 atoms, with numbers from 5 to 12 atoms being even more desirable.

At least one monomer selected from the group consisting of the specific monomer A, the specific monomer B and the specific monomer C may also be polymerized in the presence of an unsaturated hydrocarbon polymer with an olefin based unsaturated bond within the primary chain such as polybutadiene, polyisoprene, styrene-butadiene copolymers, ethylene-disconjugated diene copolymers and polynorbornene. In such cases, the specific monomer D or other copolymerizable monomers may also be included in the polymerization. The product polymers produced in such cases are useful as raw materials for high impact resistant resins.

<Polymerization Conditions>

As follows is a description of the conditions for the ring opening polymerization reaction between at least one monomer selected from the group consisting of the specific monomer A, the specific monomer B and the specific monomer C, and where necessary the specific monomer D or another copolymerizable monomer.

Catalyst

The ring opening copolymerization reaction is conducted in the presence of a metathesis catalyst.

This metathesis catalyst is a combination of (a) at least one compound selected from a group consisting of W, Mo and Re compounds, and (b) at least one compound selected from compounds of either a group IA element (such as Li, Na or K), a group IIA element (such as Mg or Ca), a group IIB element (such as Zn, Cd or Hg), a group IIIB element (such as B or Al), a group IVA element (such as Ti or Zr) or a group IVB element (such as Si, Sn or Pb) of the Deming periodic table, which contain at least one bond between the aforementioned element and carbon, or between the aforementioned element and hydrogen. In order to raise the activity of the catalyst, an additive (c) described below may also be added.

Representative examples of the W, Mo or Re compound of the aforementioned constituent (a) include those compounds disclosed in Japanese Laid-open publication (kokai) No. 1-240517 (JP1-240517A) such as WCl$_6$, MoCl$_5$ and ReOCl$_3$.

Specific examples of the aforementioned constituent (b) include those compounds disclosed in Japanese Laid-open publication (kokai) No. 1-240517 (JP1-240517A) such as n-C$_4$H$_9$Li, (C$_2$H$_5$)$_3$Al, (C$_2$H$_5$)$_2$AlCl, (C$_2$H$_5$)$_{1.5}$AlCl$_{1.5}$, (C$_2$H$_5$)AlCl$_2$, methyl alumoxane and LiH.

Representative examples of the constituent (c) include alcohols, aldehydes, ketones and amines, as well as those compounds disclosed in Japanese Laid-open publication (kokai)No. 1-240517 (JP1-240517A).

The amount of the metathesis catalyst used should typically result in a molar ratio between the aforementioned constituent (a) and the specific monomers A to D (hereafter the combination of the specific monomers A to D is referred to as simply the "specified monomers"), namely the ratio of constituent (a):specified monomers, within a range from 1:500 to 1:50,000, and preferably within a range from 1:1000 to 1:10,000.

The relative proportions of the constituent (a) and the constituent (b) should produce a metal atom ratio (a):(b) within a range from 1:1 to 1:50, and preferably from 1:2 to 1:30.

The relative proportions of the constituent (a) and the constituent (c) should produce a molar ratio (c):(a) within a range from 0.005:1 to 15:1, and preferably from 0.05:1 to 7:1.

Molecular Weight Regulating Agent

Regulation of the molecular weight of the polymer can also be achieved through controlling the polymerization temperature, the type of catalyst and the type of solvent, although in the present invention the molecular weight should preferably be regulated by adding a molecular weight regulating agent to the reaction system.

Examples of suitable molecular weight regulating agents include α-olefins such as ethylene, propene, 1-butene, 1-pentene, 1-hexene, 1-heptene, 1-octene, 1-nonene and 1-decene, as well as styrene, and of these, 1-butene and 1-hexene are preferred.

This molecular weight regulating agent may utilize a single compound, or a combination of two or more different regulating agents.

The amount of the molecular weight regulating agent used should be from 0.005 to 0.6 mols per 1 mol of the specified monomers supplied to the polymerization reaction, with quantities from 0.02 to 0.5 mols being preferred.

Ring Opening Polymerization Reaction Solvent

Examples of suitable solvents for use in the polymerization reaction include alkanes such as pentane, hexane, heptane, octane, nonane and decane; cycloalkanes such as cyclohexane, cycloheptane, cyclooctane, decalin and norbomane; aromatic hydrocarbons such as benzene, toluene, xylene, ethylbenzene and cumene; halogenated alkanes such as chlorobutane, bromohexane, methylene chloride, dichloroethane, hexamethylene dibromide, chlorobenzene, chloroform and tetrachloroethylene; saturated carboxylic acid esters such as ethyl acetate, n-butyl acetate, iso-butyl acetate, and methyl propionate; and ethers such as dibutyl ether and tetrahydrofuran, and these solvents may be used singularly, or in combinations of two or more solvents. Of the above solvents, the aforementioned aromatic hydrocarbons are preferred.

The amount of solvent used should typically result in a solvent:specified monomers ratio (weight ratio) from 1:1 to 10:1, with ratios from 1:1 to 5:1 being preferred.

Hydrogenation of the Polymer

A polymer produced in the manner described above may be used, as is, as a resin of the present invention, although any residual olefin based unsaturated bonds should preferably be hydrogenated prior to use.

The hydrogenation reaction can be performed by normal methods, namely, addition of a hydrogenation catalyst to the polymer solution, and subsequent reaction with hydrogen gas at a pressure of 1 to 300 atmospheres, and preferably 3 to 200 atmospheres, and at a temperature of 0 to 200° C., and preferably 20 to 180° C.

Examples of the hydrogenation catalyst include those catalysts typically used in hydrogenation reactions of olefin based compounds. These hydrogenation catalysts include both heterogeneous catalysts and homogeneous catalysts.

Examples of suitable heterogeneous catalysts include solid catalysts comprising a noble metal such as palladium, platinum, nickel, rhodium or ruthenium supported by a carrier such as carbon, silica, alumina or titania. Examples of suitable homogeneous catalysts include nickel naphthenate/triethyl aluminum, nickel acetylacetonate/triethyl aluminum, cobalt octenate/n-butyl lithium, titanocene dichloride/diethyl aluminum monochloride, rhodium acetate, chlorotris (triphenylphosphine)rhodium, dichlorotris(triphenylphosphine)ruthenium, chlorohydrocarbonyltris(triphenylphosphine)ruthenium, and dichlorocarbonyltris(triphenylphosphine)ruthenium. The catalysts may be in powdered or granulated form.

The hydrogenation catalyst is used in quantities which produce a polymer:hydrogenation catalyst ratio (weight ratio) within a range from $1:1\times10^{-6}$ to 1:2.

The hydrogenated polymer produced by the hydrogenation reaction displays excellent thermal stability, and the characteristics of the polymer are unlikely to deteriorate on heating during the film production process, during stretching and orientation, or during use as a finished product. The hydrogenation ratio of the olefin based unsaturated bonds is typically greater than 50%, preferably at least 70%, even more preferably at least 90%, and most preferably at least 98%.

Moreover, the aromatic ring within the structural unit a derived from at least one monomer selected from the group consisting of the specific monomer A, the specific monomer B and the specific monomer C must not undergo any significant hydrogenation within the course of the above hydrogenation reaction. This type of restricted hydrogenation reaction can be achieved by conducting the reaction under the aforementioned typical hydrogenation reaction conditions for an olefin based compound, although on occasion, minor adjustments may be required to the reaction conditions such as setting the hydrogen gas pressure to the low end of the aforementioned range, setting the reaction temperature to a low temperature within the aforementioned range, carefully selecting the hydrogenation catalyst, or adjusting the amount of the hydrogenation catalyst added. In those cases in which the specific monomer D and/or other copolymerizable monomer contain an aromatic ring, and the structural unit derived from these monomers also contains the aromatic ring, it is desirable that the reaction conditions are selected so that the unsaturated bonds of the aromatic ring undergo no significant hydrogenation.

<Characteristics of Thermoplastic Norbornene Resin>

The intrinsic viscosity ($\eta_{inh}$) of a resin of the present invention measured in chloroform at 30° C. should preferably be from 0.2 to 5 dl/g. Values from 0.3 to 4 dl/g are even more preferable, and values from 0.5 to 3 dl/g are the most desirable. At intrinsic viscosity values exceeding 5 dl/g the viscosity of the solution becomes overly large, and the workability deteriorates, whereas at values less than 0.2 dl/g, the film strength deteriorates.

The molecular weight of a resin of the present invention, measured as a polystyrene equivalent number average molecular weight (Mn) using gel permeation chromatography (GPC) is typically from 8000 to 1,000,000, and preferably from 10,000 to 500,000, and even more preferably from 20,000 to 100,000, and most preferably from 30,000 to 100,000. The weight average molecular weight (Mw) is typically within a range from 20,000 to 3,000,000, and preferably from 30,000 to 1,000,000, and even more preferably from 40,000 to 500,000, and most desirably from 40,000 to 300,000. If the Mw and Mn values exceed the above ranges then the viscosity of the solution becomes overly large and the workability deteriorates, whereas at values below the above ranges, the film strength deteriorates.

The molecular weight distribution of a resin of the present invention should typically produce a Mw/Mn ratio of 1.5 to 10, with ratios from 2 to 8 being preferred, ratios from 2.5 to 5 being even more preferred, and ratios from 2.5 to 4.5 being the most desirable. If the Mw/Mn ratio exceeds the above range, then the low molecular weight component becomes too large, and when a film is produced, this low molecular weight component may bleed out at the film surface causing the film to become sticky. In contrast, if the Mw/Mn ratio is smaller than the above range, then the film strength, and particularly the film toughness deteriorates.

The glass transition temperature (Tg) of a resin of the present invention is typically from 80 to 350° C., and preferably from 100 to 250° C. In the case of a Tg value of less than 80° C., the temperature at which thermal deformation occurs falls, and there is a danger of heat resistance problems arising in the product film. In contrast, if the Tg value exceeds 350° C., then the processing temperature required when the product film is heated and subjected to stretching processing and the like becomes overly high, and there is an increased chance of the resin undergoing thermal deterioration.

The saturated water absorption at 23° C. of a resin of the present invention is typically from 0.05 to 1% by weight, preferably from 0.1 to 0.7% by weight, and even more preferably from 0.1 to 0.5% by weight. Provided the saturated water absorption falls within the above range, the various optical characteristics such as the transparency, the retardation, the uniformity of the retardation, and the accuracy of the dimensions can be maintained even under conditions of high temperature and humidity, and because the resin offers excellent adhesion and bonding to other materials, separation and peeling during use does not occur. Furthermore, because the resin displays good compatibility with additives such as antioxidants, a greater degree of freedom is achievable relative to additives.

If the saturated water absorption is less than 0.05% by weight, then the adhesion and bonding to other materials deteriorates, and separation and peeling during use becomes more likely. Furthermore, there are also restrictions on the inclusion of additives such as antioxidants. In contrast, if the saturated water absorption exceeds 1% by weight, then absorption of water is more likely to produce variations in optical characteristics and variations in dimensions.

The aforementioned saturated water absorption values are measured in accordance with ASTM D570, and are determined by immersing the sample for 1 week in 23° C. water, and measuring the increase in weight.

The SP value (solubility parameter) of a resin of the present invention should preferably be from 10 to 30 (MPa$^{1/2}$), with values from 12 to 25 (MPa$^{1/2}$) being even more preferable, and values from 15 to 20 (MPa$^{1/2}$) being the most preferred. By ensuring the SP value falls within the above range, not only can the resin be readily dissolved in normal general purpose solvents, but a stable film production can also be achieved, the characteristics of the product film become more uniform, a product with good adhesion and bonding to other materials can be ensured, and the water absorption can also be controlled at a suitable level.

<Additives>

In a resin of the present invention, other known thermoplastic resins, thermoplastic elastomers, rubber polymers, fine organic particles or fine inorganic particles may also be added, provided they do not lower the transparency or the heat resistance of the product resin.

Other additives such as antioxidants may also be added to resins of the present invention, and examples of suitable additives such as antioxidants include the compounds listed below.

Antioxidants 2,6-di-t-butyl-4-methylphenol, 2,2'-dioxy-3,3'-di-t-butyl-5,5'-dimethyldiphenylmethane, tetrakis[methylene-3-(3,5-di-t-butyl-4-hydroxyphenyl)propionate]methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, stearyl-β-(3,5-di-t-butyl-4-hydroxyphenyl)propionate, 2,2'-dioxy-3,3'-di-t-butyl-5,5'-diethylphenylmethane, 3,9-bis[1,1-dimethyl-2-(β-(3-t-butyl-4-hydroxy-5-methylphenyl)propionyloxy)ethyl], 2,4,8,10-tetraoxaspiro[5.5]undecane, tris(2,4-di-t-butylphenyl)phosphite, and 2,2-methylenebis(4,6-di-t-butylphenyl)octylphosphite Ultraviolet Absorbing Agents 2,4-dihydroxybenzophenone and 2-hydroxy-4-methoxybenzophenone The amount of these antioxidants and the like added should typically be within a range from 0.01 to 3 parts by weight, and preferably from 0.05 to 2 parts by weight, per 100 parts by weight of the thermoplastic norbornene resin.

Additives such as lubricants may also be added to improve the workability of the resin.

<Film Production Method>

An optical film of the present invention can be produced by forming a resin of the present invention into a film or a sheet using a method such as a molten molding method or a solution stretching method (a solvent casting method). Of these methods, solvent casting methods are preferred due to the superior uniformity of the film thickness and the smoothness of the product surface.

An example of a solvent casting method involves dissolving or dispersing a resin of the present invention in a solvent to produce a liquid of a suitable concentration, pouring or applying this liquid on to a suitable carrier, drying the liquid, and then peeling the product away from the carrier.

When a thermoplastic norbornene resin is dissolved or dispersed within a solvent, the concentration of the resin is typically set to a value from 0.1 to 90% by weight, and preferably 1 to 50% by weight, and even more preferably from 10 to 35% by weight. If the concentration of the resin is less than the above range, then various problems arise such as difficulty in maintaining the film thickness, and difficulty in achieving the desired film surface smoothness due to foaming during the solvent evaporation. In contrast, if the concentration exceeds the above range, then the solution viscosity becomes overly large, and it becomes difficult to produce an optical film with uniform thickness and a uniform surface.

The viscosity of the aforementioned solution at room temperature should typically be within a range from 1 to 1,000,000 (mPa·s), and preferably from 10 to 100,000 (mPa·s), and even more preferably from 100 to 50,000 (mPa·s), with viscosity values from 1000 to 40,000 (mPa·s) being the most desirable.

Examples of suitable solvents include aromatic solvents such as benzene, toluene and xylene, cellosolve based solvents such as methyl cellosolve, ethyl cellosolve and 1-methoxy-2-propanol, ketone based solvents such as diacetone alcohol, acetone, cyclohexanone, methyl ethyl ketone, 4-methyl-2-pentanone, cyclohexanone, ethylcyclohexanone, and olefine based solvents such as 1,2-dimethylcyclohexene and 1,2-diethylcyclohexene, ester based solvents such as methyl lactate and ethyl lactate, halogen containing solvents such as 2,2,3,3-tetrafluoro-1-propanol, methylene chloride and chloroform, ether based solvents such as tetrahydrofuran and dioxane, and alcohol based solvents such as 1-pentanol and 1-butanol.

Solvents other than those listed above may also be used, and provided a solvent is used with a SP value (solubility parameter) which is typically within a range from 10 to 30 ($MPa^{1/2}$), and preferably from 10 to 25 ($MPa^{1/2}$), and even more preferably from 15 to 25 ($MPa^{1/2}$), and most preferably from 15 to 20 ($MPa^{1/2}$), then an optical film with superior surface uniformity and optical characteristics can be produced.

The above solvent may utilize either a single solvent, or a combination of two or more different solvents. In those cases in which two or more different solvents are combined, the SP value of the combined solvent should preferably fall within the SP value ranges specified above. The SP value of a mixed solvent can be determined from the relative weight ratios of each of the component solvents, and for example in the case of a two solvent mixture in which the weight proportions of the two solvents are labeled W1 and W2, and the corresponding solvent SP values are labeled SP1 and SP2 respectively, then the SP value of the mixed solvent can be determined from the formula shown below.

$$SP\ \text{value} = W1 \times SP1 + W2 \times SP2$$

In those cases in which an aforementioned solvent mixture is used, by combining a good solvent and a poor solvent of the resin of the present invention, an optical film with a light diffusing function can be obtained. Specifically, if the SP values of the resin, the good solvent and the poor solvent are labeled [SP: resin], [SP: good solvent] and [SP: poor solvent] respectively, then by ensuring that the difference between the [SP: resin] value and the [SP: good solvent] is no more than 7, and preferably no more than 5, and even more preferably no more than 3, that the difference between the [SP: resin] value and the [SP: poor solvent] is at least 7, and preferably at least 8, and even more preferably 9 or greater, and that the difference between the [SP: good solvent] value and the [SP: poor solvent] value is at least 3, and preferably at least 5, and even more preferably 7 or greater, then a light diffusing function can be imparted to the produced optical film.

The proportion of the poor solvent within the solvent mixture should be no more than 50% by weight, and preferably no more than 30% by weight, and even more preferably no more than 15% by weight, and most preferably no more than 10% by weight. The difference in the boiling points of the poor solvent and the good solvent should be at least 1° C., and preferably at least 5° C., and even more preferably at least 10° C., and most preferably at least 20° C., and a poor solvent boiling point which is higher than the good solvent boiling point is preferred.

The temperature at which the thermoplastic norbornene resin is dissolved in the solvent may be either room temperature or a higher temperature. By stirring the mixture adequately, a uniform solution can be achieved. Moreover, in those cases where coloring is required, a suitable quantity of a coloring agent such as a dye or a pigment may be added to the solution.

A leveling agent may also be added to improve the surface smoothness of the product optical film. Any of the typical leveling agents may be used, and specific examples include fluorine based nonionic surfactants, special acrylic resin based leveling agents, and silicone based leveling agents.

A typical example of a method of producing an optical film of the present invention by a solvent casting method involves using a die or a coater to apply the aforementioned solution to a substrate such as a metal drum, a steel belt, a polyester film such as polyethylene terephthalate (PET) or polyethylene naphthalate (PEN), or a polytetrafluoroethylene belt, subsequently removing the solvent by drying, and then peeling the film away from the substrate. The optical film can also be produced by applying the resin solution to the substrate using spraying, brushing, roll spin coating or dipping techniques, subsequently removing the solvent by drying, and then peeling the film away from the substrate. The thickness and the surface smoothness of the optical film can also be controlled by repeating the application process.

In those cases in which a polyester film is used as the substrate, a surface treated film may be used. Examples of surface treatment methods include the common hydrophilic treatment methods in which, for example, either an acrylic based resin or a sulfonate group containing resin is coated or laminated onto the film, or the hydrophilicity of the film surface is increased through corona discharge treatment.

If the substrate to which the aforementioned solution is applied utilizes a metal drum, a steel belt or a polyester film or the like which has undergone surface treatment such as sand mat treatment or embossing, then the undulations caused by this surface treatment are transferred to the film surface, enabling the production of an optical film with a light diffusing function.

In cases in which a light diffusing function is imparted to the optical film in this manner, then in terms of maintaining a stable light transmittance for low wavelength light through to high wavelength light, it is preferable that the aforementioned undulations are formed of uniform size. There are no particular restrictions on the form of the undulations, which will vary considerably depending on the technique used for forming the undulations, although typical surface roughness values (center line average height: Ra) are from 0.001 to 100 $\mu$m, and preferably from 0.005 to 10 $\mu$m, and even more preferably from 0.01 to 1 $\mu$m, and most preferably from 0.05 to 1 $\mu$m. If the Ra value is less than 0.001 $\mu$m or greater than 100 $\mu$m, then a good light diffusing function is difficult to achieve. However, in cases in which a lens function such as a Fresnel lens function is imparted to the optical film, the Ra value may sometimes exceed 100 $\mu$m.

An optical film with a light diffusing function of the present invention can also be produced by casting a uniform mixture produced by adding, to a solution of a resin of the present invention, another resin or a filler which is incompatible with the resin of the present invention.

Specifically, in those cases in which an aforementioned incompatible resin is added, by selecting this incompatible resin so that the difference between the indexes of refraction of the incompatible resin and the resin of the present invention is typically at least 0.00001, and preferably at least 0.0001, and even more preferably at least 0.001, and most preferably at least 0.01, and also ensuring that, in a film produced by adding this type of incompatible resin to the solvent, and subsequently mixing, casting and drying, the number average particle diameter of resin areas containing none of the aforementioned incompatible resin is typically within a range from 0.01 to 1000 $\mu$m, and preferably from 0.05 to 500 $\mu$m, and even more preferably from 0.1 to 100 $\mu$m, and most preferably from 0.5 to 50 $\mu$m, a light diffusing effect can be produced for light from low wavelengths through to high wavelengths. If the aforementioned difference in the indexes of refraction is less than 0.00001 or the aforementioned particle diameter is less than 0.01 $\mu$m, then imparting a satisfactory light diffusing function becomes difficult, whereas if the aforementioned particle diameter exceeds 1000 $\mu$m, then the transmittance of light falls markedly, and the precision of the film thickness and the surface are likely to deteriorate.

The amount of the above incompatible resin added can be varied in accordance with the light diffusion performance required, although typical quantities are from 0.001 to 100 parts by weight, and preferably 0.01 to 70 parts by weight, and even more preferably from 0.1 to 50 parts by weight, and most preferably from 1 to 25 parts by weight, per 100 parts by weight of the resin of the present invention. If the added quantity is less than 0.001 parts by weight, then achieving a satisfactory light diffusing function becomes difficult. In contrast, if the added quantity exceeds 100 parts by weight, then the light transmittance falls to an unfavorably low level.

Examples of suitable fillers which may be used include commercially available inorganic fillers, or organic fillers produced by finely crushing a cured thermosetting resin. The particle diameter of the filler and the amount of filler added are similar to the case of the aforementioned incompatible resin.

Specific examples of the incompatible resin for a resin of the present invention include polymethylmethacrylate (PMMA), polystyrene, polyvinylbenzene, polyarmide or polyimide. Specific examples of the aforementioned filler include metals such as gold or silver, metal oxides such as $SiO_2$, $TiO_2$, $ZnO_2$ and $Al_2O_3$, and particles of glass and quartz.

There are no particular restrictions on the drying (solvent removal) step in the aforementioned solvent casting method, and most common methods can be used, including passing the material through a drying oven using a plurality of rollers, although if foaming accompanies the evaporation of the solvent during the drying process, then the characteristics of the film deteriorate markedly, and so in order to prevent such foaming, it is preferable that the drying process is divided into a plurality of steps, with the temperature or the air quantity controlled at each step.

The residual solvent content within an optical film should typically be no more than 10% by weight, and preferably no more than 5% by weight, and even more preferably no more than 1% by weight, and most preferably no more than 0.5% by weight. If the residual solvent content exceeds 10% by weight, then during use, the variations in dimensions of the optical film over time will be undesirably large. The presence of residual solvent also causes a reduction in Tg, and a reduction in heat resistance, both of which are undesirable.

In order to ensure that the stretching and orientation step described below is performed satisfactorily, there are cases where the amount of the residual solvent must be adjusted within the aforementioned range. Specifically, in order to ensure a stable and uniform retardation during stretching and orientation, the residual solvent content should typically be from 10 to 0.1% by weight, and preferably from 5 to 0.1% by weight, and even more preferably from 1 to 0.1% by weight. By limiting the residual solvent content, either the stretching process becomes easier, or control of the retardation becomes simpler.

The thickness of an optical film of the present invention is typically from 0.1 to 3000 $\mu$m, and preferably from 0.1 to 1000 $\mu$m, and even more preferably from 1 to 500 $\mu$m, and most preferably from 5 to 300 $\mu$m. At a thickness of less than 0.1 $\mu$m, actual handling of the film becomes difficult, whereas in contrast, at a thickness exceeding 3000 $\mu$m, winding the film into a roll becomes difficult.

The thickness distribution of an optical film of the present invention is typically within ±20% of the average thickness value, and preferably within ±10%, and even more preferably within ±5%, and most preferably within ±3%. The variation in thickness of the film across 1 cm is typically no more than 10%, and preferably no more than 5%, and even more preferably no more than 1%, and most preferably no more than 0.5%. By controlling the thickness in this manner, irregularity in the retardation on stretching and orientation can be prevented.

Third Aspect of the Invention

<Optical Film for Imparting Retardation to Transmitted Light>

This aspect of the present invention provides an optical film for imparting retardation to transmitted light (hereafter referred to as a retardation film). In this type of retardation film, because the thermoplastic norbornene resin polymer chains which make up the film are oriented in a uniform direction, a retardation can be imparted to transmitted light. This retardation film, particularly the single resin-layer film, can be obtained by conducting a stretching process on an optical film of the first aspect and/or the second aspect of the present invention in order to orient the polymer chains in a regular manner. What is described here as a regular orientation refers to a retardation film in which overall, the molecular chains are oriented in a regular pattern, either in one axial direction within the plane of the film, or in both axial directions, or even in the direction through the thickness of the film, which contrasts with the more typical situation in which a film of a typical polymer formed by either a molten extrusion method or a solvent casting method, described below, comprises molecular chains which are aligned in no one specific direction, but rather exist in a random arrangement, although this arrangement will vary depending on the size of distortions generated within the film during the formation process. The regularity of the orientation within such an oriented film will vary.

Examples of stretching process methods for producing a retardation film of the present invention include known uniaxial stretching methods and biaxial stretching methods. In other words, suitable methods include transverse uniaxial stretching techniques using a tenter method, roll compression stretching techniques and longitudinal uniaxial stretching techniques using two sets of rollers of different circumference, as well as biaxial stretching techniques combining a transverse axial stretch and a longitudinal axial stretch, and stretching techniques using inflation methods.

In the case of a uniaxial stretching method, the stretching speed should typically be from 1 to 5000%/min, and preferably from 50 to 1000%/min, and even more preferably from 100 to 1000%/min, and most preferably from 100 to 500%/min.

Biaxial stretching includes both the case in which stretching occurs simultaneously in two directions, and the case in which stretching is first performed in one direction, and then subsequently performed in a second direction different from the first. In such cases, there are no particular restrictions on the angle of intersection between the two stretching axes for controlling the shape of the index ellipsoid of the film following stretching, and this angle is determined by the specific product characteristics desired, although typically the angle is within a range from 120 to 60°. The stretching speed may be the same in both directions, or may be different in each direction, although typically the stretching speed in both directions should be from 1 to 5000%/min, and preferably from 50 to 1000%/min, and even more preferably from 100 to 1000%/min, and most preferably from 100 to 500%/min.

There are no particular restrictions on the stretching process temperature, although referenced against the glass transition temperature Tg of the resin of the present invention, the temperature should typically be Tg±30° C., and preferably Tg±15° C., and even more preferably within a range from Tg−5° C. through to Tg+15° C. By maintaining the stretching process temperature within this range, irregularities in retardation can be suppressed, and the index ellipsoid can be controlled more easily.

There are no particular restrictions on the stretching magnification, with this figure typically being determined by the specific product characteristics desired, although typical magnification values should be from 1.01 to 10 fold, and preferably from 1.03 to 5 fold, and even more preferably from 1.03 to 3 fold. If the stretching magnification exceeds 10 fold, then controlling the retardation may become difficult.

The stretched film may simply be cooled, as is, although the film should preferably be heat set by holding the film in an atmosphere at a temperature between Tg−20° C. and Tg for at least 10 seconds, and preferably for 30 to 60 seconds, and even more preferably for 1 to 60 minutes. By so doing, variations in the transmitted light retardation over time can be suppressed, enabling a stable retardation film to be produced.

The contraction coefficient, on heating, of the dimensions of an optical film of the present invention which has not been subjected to stretching, in the case of heating for 500 hours at 100° C., is typically no more than 5%, and preferably no more than 3%, and even more preferably no more than 1%, and most preferably no more than 0.5%.

The contraction coefficient, on heating, of the dimensions of a retardation film of the present invention, in the case of heating for 500 hours at 100° C., is typically no more than 10%, and preferably no more than 5%, and even more preferably no more than 3%, and most preferably no more than 1%.

A contraction coefficient within the above range can be achieved by a variety of techniques including appropriate selection of the raw material specified monomers for a resin of the present invention, appropriate selection of other copolymerizable monomers, adjustment of the conditions for the casting method employed, and adjustment of the conditions for the stretching process.

In a stretched film produced in the manner described above, the molecules are aligned as a result of the stretching, and a retardation is imparted to transmitted light, although this retardation can be controlled by factors such as the stretching magnification, the stretching temperature and the thickness of the film. For example, for films of the same thickness prior to stretching, those films with larger stretching magnification display a tendency to produce larger absolute values for the retardation of transmitted light, and consequently by varying the stretching magnification, a retardation film can be produced which imparts a desired level of retardation to the transmitted light. In contrast, for films subjected to the same stretching magnification, those films which displayed a greater thickness prior to stretching have a tendency to produce larger absolute values for the retardation of transmitted light, and consequently by varying the film thickness prior to stretching, a retardation film can be produced which imparts a desired level of retardation to the transmitted light. Within the stretching process temperature range described above, lower stretching temperature values have a tendency to produce larger absolute values for the retardation of transmitted light, and consequently by varying the stretching temperature, a retardation film can be produced which imparts a desired level of retardation to the transmitted light.

The value of the retardation imparted to transmitted light by a stretched retardation film produced in the aforementioned manner can be determined in line with the intended use of the film, and as such there are no particular restrictions, although in those cases in which the film is used within a liquid crystal display element, an electroluminescence display element or a wave plate of a laser optics system, the retardation value is typically from 1 to 10,000 nm, and preferably from 10 to 2000 nm, and even more preferably from 15 to 1000 nm.

The retardation of light which has passed through a retardation film should preferably display a high level of uniformity, and at a wavelength of 550 nm, the variation in the retardation from the average value should typically be no more than ±20%, and preferably no more than ±10%, and even more preferably no more than ±5%. If the variation in the retardation exceeds ±20%, then use of the film within a liquid crystal display element or the like would result in color irregularities and the like, producing a deterioration in the overall performance of the display.

Provided the ratio between the retardation Re(550) of transmitted light at a wavelength of 550 nm and the retardation Re(400) of transmitted light at a wavelength of 400 nm, namely the ratio Re(400)/Re(550), falls within a range from 1.5 to 1.0, and the ratio between the aforementioned retardation Re(550) and the retardation Re(800) of transmitted light at a wavelength of 800 nm, namely the ratio Re(800)/Re(550), falls within a range from 1.0 to 0.5, then when the retardation film is used as a retardation plate within a liquid crystal display element, an optical compensation can be made for the retardation of light which has passed through the liquid crystal layer, enabling the definition of the display to be maintained and minor adjustments to be made to the color tone.

In addition, in the case of an index ellipsoid in which the direction within the plane of the optical film at which the index of refraction is largest is labeled the x axis, the direction within the plane which is orthogonal to this x axis is labeled the y axis, the direction through the thickness of the film perpendicular to the plane of the film is labeled the z axis, and the corresponding indexes of refraction are labeled Nx, Ny and Nz respectively, if the degree of refractive index anisotropy, which is represented by the formula (Nx+Ny)/2−Nz, is within ±0.1, and preferably within ±0.01, and even more preferably within ±0.005, and most preferably within ±0.001, then in cases in which the optical film is used as a STN liquid crystal display element member, the viewing angle dependency is favorably small.

A retardation film of the present invention comprising a single resin-layer or comprising at least two resin-layers prepared by laminating two or more single resin-layer film together can be used as is, or such films could be bonded to a transparent substrate to form a retardation plate. This retardation plate could also be laminated to other films, sheets or substrates. In cases in which lamination is used, adhesives can be used. Highly transparent adhesives are preferred, and specific examples include pressure sensitive adhesives such as natural rubber, synthetic rubber, vinyl acetate/vinyl chloride copolymers, polyvinyl ether, acrylic based resins and modified polyolefin based resins, curable pressure sensitive adhesives such as the aforementioned resins with a functional group such as a hydroxy group or an amino group to which a curing agent such as an isocyanate group containing compound is added, dry lamination polyurethane based adhesives, synthetic rubber based adhesives and epoxy based adhesives.

In order to improve the efficiency of laminating on another sheet or a substrate, the aforementioned retardation film and the retardation plate can also be laminated, in advance, with an adhesive layer. In such cases, any of the adhesives described above can be used.

<Optical Film With Transparent Conductive Layer>

In an optical film of the present invention, a transparent conductive layer may be laminated to at least one surface of the optical film. Examples of suitable materials for forming such a transparent conductive layer include metals such as Sn, In, Ti, Pb, Au, Pt and Ag, as well as oxides of these metals, and either a simple metal film is formed on the surface of the substrate, or where necessary, the metal film may be subsequently oxidized. The conventional method comprises the adhesion of an oxide layer, although a film can first be formed from a simple metal or a low level oxide, and this film then converted to a transparent film by oxidation using either thermal oxidation, anodic oxidation or liquid phase oxidation. These transparent conductive layers may be formed by bonding another sheet or film comprising a transparent conductive layer to an optical film, or may be formed directly onto an optical film of the present invention using plasma polymerization methods, sputtering, vacuum deposition, plating, ion plating, spraying methods or electrolytic deposition. There are no particular restrictions on the thickness of the transparent conductive layer, which can be determined in accordance with the desired characteristics, although typically the thickness should be from 10 to 10,000 Angstroms, and preferably from 50 to 5000 Angstroms.

In those cases in which a transparent conductive layer is formed directly on an optical film of the present invention, an adhesive layer or an anchor coat layer may be provided between the film and the transparent conductive layer where necessary. Examples of suitable adhesives include heat resistant resins such as epoxy resins, polyimides, polybutadiene, phenol resins and polyether ether ketones. The aforementioned anchor coat layers utilize materials incorporating so-called acrylic prepolymers such as epoxy diacrylate, urethane diacrylate and polyester diacrylate, and these layers can be cured using known curing techniques such as UV curing or thermosetting.

An optical film with a transparent conductive layer of the present invention can be formed into a laminated product in combination with a polarizing film as a substate. There are no particular restrictions on the method used for combining the optical film with a transparent conductive layer of the present invention and the polarizing film, and one suitable method involves laminating the optical film with a transparent conductive layer to at least one surface of a polarizing film produced by laminating a protective film to both sides of a polarizing membrane, via a suitable adhesive applied to the opposite side of the optical film from the transparent conductive layer. Alternatively, the optical film with a transparent conductive layer of the present invention could also be used instead of employing the above polarizing membrane protective films, with the polarizing membrane being bonded directly to the optical film, via a suitable adhesive applied to the opposite side of the optical film from the transparent conductive layer. An optical film of the present invention with no transparent conductive layer may also be used as a protective film for a polarizing film which is a substrate. In such a case, if a retardation film of the present invention is used as the protective film, then the protective film will function as a retardation plate, and consequently there is no need to bond a separate retardation plate to the polarizing film.

Where necessary, a gas barrier material such as polyvinylidine chloride or polyvinyl alcohol may also be laminated to at least one surface of an optical film with a transparent conductive layer according to the present invention, in order to lower the transmittance of oxygen and water vapor. In addition, a hard coat layer may then be laminated on top of the gas barrier layer in order to improve the scratch resistance and heat resistance of the film. Examples of suitable hard coat materials include organic hard coat materials such as organic silicon based resins, melamine resins, epoxy resins and acrylic resins, as well as inorganic hard coat materials such as silicon dioxide. Of these materials, organic silicon based resins and acrylic resins are preferred. The organic silicon based resins include resins with all manner of functional groups, although resins with epoxy groups are preferred.

<Optical Film With Antireflective Layer>

In an optical film of the present invention, an antireflective layer may be laminated to at least one surface of the optical film. An example of a commonly used method of forming the antireflective layer involves forming an antireflective film of either an inorganic system comprising a metal oxide of silicon, titanium, tantalum or zirconium, or an organic system comprising a fluorine containing compound such as a (co)polymer of fluorinated vinylidene, hexafluoropropylene, or tetrafluoroethylene, or a (co)polymer of a fluorine containing (meth)acrylate, at a thickness of 0.01 to 10 μm, using sputtering, vapor deposition, coating or dipping methods. The thickness of the antireflective layer is typically from 0.01 to 50 μm, and preferably from 0.1 to 30 μm, and even more preferably from 0.5 to 20 μm. If the thickness is less than 0.01 μm, then the desired antireflective effect is not achieved, whereas if the thickness exceeds 50 μm, then the likelihood of irregularities in the thickness of the applied film increases, causing a deterioration in the external appearance.

A known hard coat layer or a dirt prevention layer may also be laminated to an optical film with an antireflective layer according to the present invention. An aforementioned transparent conductive layer may also be laminated if required. In addition, the optical film may possess a function for imparting a retardation to transmitted light, or a light diffusing function.

By providing the film with a plurality of functions, as described above, an optical film with an antireflective layer according to the present invention can enable a reduction to be made in the number of components of a film, so that for example, when such an optical film is used within a liquid crystal display element, the antireflective film may combine a number of functions including that of a retardation plate, a light diffusing film, a polarizing plate protective film or an electrode substrate (transparent conductive layer).

As follows is a more detailed description of the present invention using a series of working examples. However, the present invention is in no way limited to the examples presented below. In the description below, unless otherwise specified the units "parts" and "%" refer to "parts by weight" and "% by weight" respectively.

First is a description of the measurement methods used for obtaining the various measurement values disclosed below.

[Glass Transition Temperature (Tg)]

Using a differential scanning calorimeter (DSC) manufactured by Seiko Instruments Inc., the glass transition temperature was measured under a nitrogen atmosphere, with a programming rate of 20° C./min.

[Saturated Water Absorption]

Saturated water absorption values were measured in accordance with ASTM D570, and were determined by immersing a sample in 23° C. water for 1 week, and measuring the increase in weight.

[Total Light Transmittance, Haze]

These values were measured using a haze meter, HGM-2DP manufactured by Suga Test Instruments Co., Ltd.

[Transmitted Light Retardation]

The retardation of transmitted light was measured using a KOBRA-21ADH and a KOBRA-CCD, both manufactured by Oji Scientific Instruments Co., Ltd. A total of 10 measurements at different locations were conducted for each sample, and the average of those 10 values was reported as the retardation for that sample.

The variation in the retardation was calculated using the formula below.

$$Re(m)/Re(A) \times 100$$

wherein, $Re(m)$ represents the absolute value of the difference between the maximum or the minimum value and the average value, and $Re(A)$ represents the average value. The larger of the two absolute values was used in the variation calculations.

SYNTHETIC EXAMPLE 1

200 parts of 8-methyl-8-methoxycarbonyltetracyclo[4.4.0.1$^{2,5}$.1$^{7,10}$]-3-dodecene (the specific monomer D), 50 parts of 5-(4-biphenylcarbonyloxymethyl)bicyclo[2.2.1]hept-2-ene (the specific monomer A), 18 parts of 1-hexene (molecular weight regulating agent) and 750 parts of toluene were combined in a reaction vessel under a nitrogen atmosphere, and the solution was then heated to 60° C. To this solution in the reaction vessel were then added 0.62 parts of a toluene solution of triethyl aluminum (1.5 mol/l) as a polymerization catalyst and 3.7 parts of a toluene solution (with a concentration of 0.05 mol/l) of tungsten hexachloride denatured with t-butanol and methanol (t-butanol:methanol:tungsten=0.35 mol:0.3 mol:1 mol), and the system was subsequently stirred for 3 hours at 80° C. to enable the ring opening polymerization reaction to proceed, and yielded a solution of a ring opening polymer. The polymerization conversion rate was 97%, and the intrinsic viscosity ($\eta_{inh}$) of the ring opening polymer, measured in chloroform at 30° C., was 0.66 dl/g.

4000 parts of the thus obtained ring opening polymer solution was placed in an autoclave, 0.48 parts of RuHCl(CO)[P(C$_6$H$_5$)$_3$]$_3$ was added to the solution, and the resulting mixture was then stirred for 3 hours with heating, under a hydrogen gas pressure of 100 kg/cm$^2$ and with a reaction temperature of 165° C. to complete the hydrogenation reaction.

The reaction product solution (hydrogenated polymer solution) was cooled, and the excess hydrogen gas was expelled. The reaction solution was then poured into a large quantity of methanol, the precipitate was separated and recovered, and this precipitate was dried to yield a hydrogenated polymer.

The hydrogenation ratio of olefin based unsaturated bonds within the hydrogenated polymer produced in this manner (hereafter referred to as resin (a-1)) was measured using 400 MHz, $^1$H-NMR and revealed a ratio of 99.9%, whereas in contrast, the aromatic rings were essentially unhydrogenated. Measurement of the glass transition temperature (Tg) of the resin (a-1) using a DSC method revealed a value of 160° C. Measurement of the polystyrene equivalent number average molecular weight (Mn) and the weight average molecular weight (Mw) of the resin (a-1) using GPC methods (solvent: tetrahydrofuran) revealed a number average molecular weight (Mn) of 47,000 and a weight average molecular weight (Mw) of 187,000, giving a molecular weight distribution (Mw/Mn) of 3.98. Measurement of the saturated water absorption of the resin (a-1) at 23° C. yielded a value of 0.3%, and measurement of the SP value produced a result of 19 ($MPa^{1/2}$). Measurement of the intrinsic viscosity ($\eta_{inh}$) of the resin (a-1) in chloroform at 30° C. produced a value of 0.68 dl/g.

SYNTHETIC EXAMPLE 2

With the exception of using 175 parts of 8-methyl-8-methoxycarbonyltetracyclo[$4.4.0.1^{2,5}.1^{7,10}$]-3-dodecene (the specific monomer D) and 75 parts of 1,4-methano-1,4,4a,9a-tetrahydrofluorene (alternative name: 1H,4H,4aH,9aH-1,4-methanofluorene) (the specific monomer C), reaction was conducted in a similar manner to the synthetic example 1 and yielded a hydrogenated resin (b-1). The hydrogenation ratio of the olefin based unsaturated bonds of the resin (b-1), as measured by 400 MHz, $^1$H-NMR, was 99.9%, whereas the aromatic rings were essentially unhydrogenated. The value of Tg for the resin was 155° C., and measurement of the polystyrene equivalent number average molecular weight (Mn) and the weight average molecular weight (Mw) using GPC methods (solvent: tetrahydrofuran) revealed a number average molecular weight (Mn) of 32,000 and a weight average molecular weight (Mw) of 120,000, giving a molecular weight distribution (Mw/Mn) of 3.75. Measurement of the saturated water absorption of the resin (b-1) at 23° C. yielded a value of 0.2%, and measurement of the intrinsic viscosity ($\eta_{inh}$) produced a value of 0.61 dl/g.

SYNTHETIC EXAMPLE 3

With the exception of using 200 parts of 8-methyl-8-methoxycarbonyltetracyclo[$4.4.0.1^{2,5}.1^{7,10}$]-3-dodecene (the specific monomer D) and 50 parts of 1,2-(2H,3H-[1,3]epicyclopenta)-1,2-dihydroacenaphthylene (the specific monomer B), reaction was conducted in a similar manner to the synthetic example 1 and yielded a hydrogenated resin (c-1). The hydrogenation ratio of the olefin based unsaturated bonds of the resin (c-1), as measured by 400 MHz, $^1$H-NMR, was 99.9%, whereas the aromatic rings were essentially unhydrogenated. The value of Tg for the resin was 175° C., and measurement of the polystyrene equivalent number average molecular weight (Mn) and the weight average molecular weight (Mw) using GPC methods (solvent: tetrahydrofuran) revealed a number average molecular weight (Mn) of 42,000 and a weight average molecular weight (Mw) of 180,000, giving a molecular weight distribution (Mw/Mn) of 4.29.

COMPARATIVE SYNTHETIC EXAMPLE 1

With the exception of using 250 parts of 8-methyl-8-methoxycarbonyltetracyclo[$4.4.0.1^{2,5}.1^{7,10}$]-3-dodecene (the specific monomer D) as the only monomer, reaction was conducted in a similar manner to the synthetic example 1 and yielded a hydrogenated polymer (d-1). The hydrogenation ratio of the olefin based unsaturated bonds of the resin (d-1), as measured by 400 MHz, $^1$H-NMR, was 99.9%. The value of Tg for the resin was 170° C., and measurement of the polystyrene equivalent number average molecular weight (Mn) and the weight average molecular weight (Mw) using GPC methods (solvent: tetrahydrofuran) revealed a number average molecular weight (Mn) of 38,000 and a weight average molecular weight (Mw) of 122,000, giving a molecular weight distribution (Mw/Mn) of 3.21.

EXAMPLE 1

The aforementioned resin (a-1) was dissolved in toluene to produce a concentration of 30% (the viscosity of the solution at room temperature was 30,000 mPa·s), and an INVEX lab coater manufactured by Inoue Kinzoku Kogyo Co., Ltd. was then used to apply the solution to a PET film (Lumirror U94 manufactured by Toray Industries Co., Ltd.) of thickness 100 μm which had been subjected to hydrophilic surface treatment with an acrylic acid based system (to improve the adhesion), in sufficient quantity to produce a film, on drying, with a thickness of 100 μm. The film was then subjected to preliminary drying at 50° C., and then secondary drying at 90° C. The resin film was then peeled away from the PET film to yield a resin film (a-2). The residual solvent content of the thus obtained film was 0.5%.

The photoelastic coefficient ($C_P$) and the stress optical coefficient ($C_R$) for this film (a-2) were determined using known methods (Polymer Journal, Vol. 27, No. 9, pp 943–950 (1995)). Namely, the photoelastic coefficient ($C_P$) was determined by applying a variety of constant loads to strip samples of the film at room temperature (25° C.), and calculating the photoelastic coefficient ($C_P$) from the retardation generated and the stress on the sample at that time. The stress optical coefficient ($C_R$) was determined by applying a variety of constant loads to sample films at a temperature exceeding Tg, stretching the films several percent, and then slowly cooling the films back to room temperature, subsequently measuring the retardation generated in each case, and then calculating the stress optical coefficient ($C_R$) from these retardation values and the applied stress values. The results of these measurements revealed $C_P$=5 ($\times 10^{-12} Pa^{-1}$) and $C_R$=2,900 ($\times 10^{-2} Pa^{-1}$).

The film (a-2) was heated to a temperature of Tg+5° C., namely 165° C., in a tenter, and then stretched 1.08 fold at a stretching speed of 400%/min. The stretched film was then held for approximately two minutes while being cooled in a 140° C. atmosphere, and was then further cooled to room temperature before being removed, and yielded a retardation film (a-3) of thickness 94 μm which at a wavelength of 550 nm imparted a retardation of 140 nm to transmitted light. Another film was produced in a similar manner to that described above but with a stretching magnification of 1.28 fold, and yielded a retardation film (a-4) of thickness 90 μm which at a wavelength of 550 nm imparted a retardation of 280 nm to transmitted light.

For each of these retardation films (a-3) and (a-4), the total light transmittance, the haze, and the variation in the retardation of transmitted light were measured. The results are shown in Table 1. Samples of the resin films (a-3) and (a-4) were also laminated together so that the respective optical axes intersected at an angle of 62°, and the wavelength dependency of the retardation of transmitted light was then measured. In other words, the value of Re(λ)/λ (wherein, Re(λ) is the retardation value for transmitted light of a wavelength λ) within a wavelength range from 400 to 800 nm was measured for the retardation plate, and these results were plotted in FIG. 1. In FIG. 1, Re(λ) has been abbreviated to Re.

EXAMPLE 2

The resin (b-1) was dissolved in toluene to produce a concentration of 30% (the viscosity of the solution at room temperature was 29,000 mPa·s), and the same methods as those described in the example 1 were then used to produce a resin film (b-2) of thickness 100 μm with a residual solvent content of 0.5%.

Measurement of the photoelastic coefficient ($C_P$) and the stress optical coefficient ($C_R$) for this film (b-2), using the same methods as described in the example 1, revealed values of $C_P$=10 ($\times 10^{-12} Pa^{-1}$) and $C_R$=2,400 ($\times 10^{-12} Pa^{-1}$).

In a similar manner to the example 1, this film (b-2) was heated to a temperature of Tg+5° C., namely 160° C., in a tenter, and then stretched 1.30 fold at a stretching speed of 400%/min. The stretched film was then held for approximately two minutes while being cooled in a 135° C. atmosphere, and was then further cooled to room temperature before being removed, and yielded a retardation film (b-3) of thickness 90 μm which at a wavelength of 550 nm imparted a retardation of 270 nm to transmitted light.

For the thus produced retardation film (b-3), the total light transmittance, the haze, and the variation in the retardation of transmitted light were then measured. The results are shown in Table 1.

EXAMPLE 3

The resin (c-1) was dissolved in toluene to produce a concentration of 30% (the viscosity of the solution at room temperature was 40,000 mPa·s), and the same methods as those described in the example 1 were then used to produce a resin film (c-2) of thickness 100 μm with a residual solvent content of 0.6%.

Measurement of the photoelastic coefficient ($C_P$) and the stress optical coefficient ($C_R$) for this film (c-2), using the same methods as described in the example 1, revealed values of $C_P$=15 ($\times 10^{-12} Pa^{-1}$) and $C_R$=2,500 ($\times 10^{-12} Pa^{-1}$).

In a similar manner to the example 1, this film (c-2) was heated to a temperature of Tg+5° C., namely 180° C., in a tenter, and then stretched 1.31 fold at a stretching speed of 400%/min. The stretched film was then held for approximately two minutes while being cooled in a 155° C. atmosphere, and was then further cooled to room temperature before being removed, and yielded a retardation film (c-3) of thickness 90 μm which at a wavelength of 550 nm imparted a retardation of 280 nm to transmitted light.

For the thus produced retardation film (c-3), the total light transmittance, the haze, and the variation in the retardation of transmitted light were then measured. The results are shown in Table 1.

COMPARATIVE EXAMPLE 1

The resin (d-1) was dissolved in toluene to produce a concentration of 30% (the viscosity of the solution at room temperature was 31,000 mPa·s), and the same methods as those described in the example 1 were then used to produce a resin film (d-2) of thickness 100 μm with a residual solvent content of 0.5%.

Measurement of the photoelastic coefficient ($C_P$) and the stress optical coefficient ($C_R$) for this film (d-2), using the same methods as described in the example 1, revealed values of $C_P$=4 ($\times 10^{-12} Pa^{-1}$) and $C_R$=1,440 ($\times 10^{-12} Pa^{-1}$).

In a similar manner to the example 1, this film (d-2) was heated to a temperature of Tg+5° C., namely 175° C., in a tenter, and then stretched 1.30 fold at a stretching speed of 400%/min. The stretched film was then held for approximately two minutes while being cooled in a 150° C. atmosphere, and was then further cooled to room temperature before being removed, and yielded a retardation film (d-3) of thickness 90 μm which at a wavelength of 550 nm imparted a retardation of 97 nm to transmitted light. Another film was produced in a similar manner to that described above but with a stretching magnification of 1.70 fold, and yielded a retardation film (d-4) of thickness 85 μm which at a wavelength of 550 nm imparted a retardation of 184 nm to transmitted light.

For each of these retardation films (d-3) and (d-4), the total light transmittance, the haze, and the variation in the retardation of transmitted light were then measured. The results are shown in Table 1.

COMPARATIVE EXAMPLE 2

Using a commercially available bisphenol A type polycarbonate resin (Product number C-1400, manufactured by Teijin Ltd.), and using the same methods as those described in the example 1, a resin film (e-1) of thickness 100 μm with a residual solvent content of 0.5% was produced. Measurement of the photoelastic coefficient ($C_P$) and the stress optical coefficient ($C_R$) for this film (e-1), using the same methods as described in the example 1, revealed values of $C_P$=150 ($\times 10^{-12} Pa^{-1}$) and $C_R$=4,700 ($\times 10^{-12} Pa^{-1}$).

In a similar manner to the example 1, this film (e-1) was heated to a temperature of Tg+5° C., namely 150° C., in a tenter, and then stretched 1.30 fold at a stretching speed of 400%/min. The stretched film was then held for approximately two minutes while being cooled in a 125° C. atmosphere, and was then further cooled to room temperature before being removed, and yielded a retardation film (e-2) of thickness 90 μm which at a wavelength of 550 nm imparted a retardation of 520 nm to transmitted light. Another film was produced in a similar manner to that described above but with a stretching magnification of 1.05 fold, and yielded a retardation film (e-3) of thickness 95 μm which at a wavelength of 550 nm imparted a retardation of 280 nm to transmitted light.

For each of these retardation films (e-2) and (e-3), the total light transmittance, the haze, and the variation in the retardation of transmitted light were then measured. The results are shown in Table 1.

TABLE 1

|  | Example 1 | | Example 2 | Example 3 |
| --- | --- | --- | --- | --- |
| Retardation film | a-3 | a-4 | b-3 | c-3 |
| Stretching magnification | 1.08 | 1.28 | 1.30 | 1.31 |
| Total light transmittance (%) | 93 | 93 | 93 | 93 |
| Haze (%) | 0.1 | 0.1 | 0.1 | 0.1 |
| Retardation (nm) | 140 | 280 | 270 | 280 |
| Retardation variation (%) | 1 or less | 1 or less | 1 or less | 1 or less |

|  | Comparative Example 1 | | Comparative Example 2 | |
| --- | --- | --- | --- | --- |
| Retardation film | d-3 | d-4 | e-2 | e-3 |
| Stretching magnification | 1.30 | 1.70 | 1.30 | 1.05 |

TABLE 1-continued

| Total light transmittance (%) | 93 | 93 | 90 | 90 |
|---|---|---|---|---|
| Haze (%) | 0.1 | 0.2 | 0.2 | 0.2 |
| Retardation (nm) | 97 | 184 | 520 | 280 |
| Retardation variation (%) | 1 or less | 1 or less | 5 | 8 |

EXAMPLE 4, COMPARATIVE EXAMPLE 3

A series of test samples were prepared by cutting each of the retardation films (a-4), (b-3), (c-3) and (e-3) obtained in the examples 1 to 3 and the comparative example 2 into a 10 cm square sheet, and then bonding a 1 cm×10 cm aluminum plate to two opposing edges of each sheet using a cyanoacrylate system adhesive (Aron Alpha "High Speed EX", manufactured by Konishi Co., Ltd.) (bonding surface: 0.5 cm×10 cm). Each of the test samples was subsequently suspended via one of the attached aluminum plates, a 100 g load was attached to the other aluminum plate, and the sample was then left to hang for 24 hours in an atmosphere at a temperature −50° C. below the glass transition temperature of the resin of the retardation film. Each sample was then removed, cooled to room temperature, and the retardation at 550 nm was measured. The results are shown in Table 2.

TABLE 2

| Retardation film | a-4 | b-3 | c-3 | e-3 |
|---|---|---|---|---|
| Initial retardation value (nm) | 280 | 270 | 280 | 280 |
| Retardation value after hanging (nm) | 280 | 270 | 280 | 380 |

As is clearly evident from a comparison of the aforementioned examples 1 to 3, and the comparative example 1, an optical film incorporating a thermoplastic norbornene resin with the essential structural unit of the present invention imparts a larger retardation to transmitted light for the same stretching magnification than an optical film incorporating a thermoplastic norbornene resin which does not contain the aforementioned essential structural unit, meaning the processing for producing a desired retardation film is relatively easier with the optical film of the present invention. Even if a resin contains the essential structural unit of the present invention, the variation in retardation is still extremely small, and the favorable characteristics offered by conventional thermoplastic norbornene resins are retained.

In addition, as is evident from a comparison of the aforementioned examples 1 to 3 and the comparative example 2, the retardation film formed from the polycarbonate resin, of which the photoelastic coefficient ($C_P$) and the stress optical coefficient ($C_R$) are outside the scope of the present invention, is low in uniformity of the retardation of the transmitted light with respect to its wavelength, and as is evident from Table 2 it is low in stability and therefore varies with lapse of time depending on factors such as the environment.

EXAMPLE 5

The films (a-3), (b-3) and (c-3) were each subjected to sand mat treatment, to produce optical films, (a-5), (b-6) and (c-6) respectively, with a light diffusing function and with haze values of 55% and total light transmittance values of 93%. None of the films displayed any discernible changes in the haze value or the total light transmittance, even after standing for 500 hours in a high temperature, high humidity chamber under conditions of 80° C. and 90% humidity.

EXAMPLE 6

A transparent conductive membrane was formed on one surface of each of the films (a-3), (b-3) and (c-3), using sputtering techniques with a target of indium oxide/tin oxide (weight ratio of 95:5), to yield transparent conductive films (a-6), (b-7) and (c-7) respectively. These transparent conductive films were then visually inspected for transparency and external appearance (the presence or absence of scratches, and the degree of warping of the film). The transparent conductive films were then subjected to a 500 hour durability test under conditions of 80° C. and a relative humidity of 90%, and the external appearance of each film was then visually inspected for evidence of changes (moisture resistance). All of the transparent conductive films displayed a good level of transparency with total light transmittance exceeding 85%, and the external appearance was also excellent, with no scratches, warping or swelling.

EXAMPLE 7

A film of Opstar JN7212 manufactured by JSR Corporation was applied to one surface of each of the films (a-3), (b-3) and (c-3), in sufficient quantity to produce a dried thin film of thickness 0.1 μm, thereby producing films (a-7), (b-8) and (c-8), respectively, with antireflective layers. All three films displayed excellent antireflective characteristics, with a reflectance of no more than 1%.

EXAMPLE 8

Polarizing films were first prepared by immersing a polyvinyl alcohol film of thickness 50 μm into a 40° C. solution containing 5 g of iodine, 250 g of potassium iodide, 10 g of boron and 1000 g of water, and then uniaxially stretching the film by a factor of 4 fold over a period of approximately 5 minutes. To the surface of each polarizing film was applied an adhesive produced by combining 100 parts of an acrylic based resin formed from a monomer mixture of 90% by weight of n-butyl acrylate, 7% by weight of ethyl acrylate and 3% by weight of acrylic acid, and 2 parts of a cross linking agent formed from a 75% by weight ethyl acetate solution of a trimethylolpropane (1 mol) addition product of tolylenediisocyanate (3 mols), and the films (a-2), (b-2) and (c-2) were subsequently laminated to both sides of one of the polarizing films to produce polarizing plates (a-8), (b-9) and (c-9) respectively. These polarizing plates were each subjected to a 500 hour durability test under conditions of 80° C. and a relative humidity of 90%, and the external appearance of each plate was visually inspected for evidence of changes, but no abnormalities such as whitening or blistering could be detected in the external appearance of any of the plates, and the degree of polarization was also at least 95% of the original value in each case, indicating a good degree of durability.

EXAMPLE 9

With the exception of using a mat treated PET film with surface irregularities, the same method as that described in the example 1 was used to prepare a film (a-9). The film had a haze value of 10% and a total light transmittance of 93%. Even after standing for 500 hours in a high temperature high, humidity chamber under conditions of 80° C. and 90% humidity, there were no discernible changes in the haze value or the total light transmittance.

INDUSTRIAL APPLICABILITY

An optical film of the present invention displays all of the advantages associated with conventional thermoplastic norbornene resin based films including superior optical characteristics such as a high degree of transparency, a low retardation, and a uniform and stable application of retardation to transmitted light upon stretching and orientation, together with good levels of heat resistance and adhesion and bonding with other materials, and little deformation on water absorption, and in addition also possesses a high degree of toughness which has not been obtainable with conventional thermoplastic norbornene resin systems. Moreover during production, the retardation of transmitted light can also be controlled. Consequently, this type of optical film can be used as a retardation film, and as an optical film with a light diffusing function, transparent conductivity, or an antireflective function, and potential applications include liquid crystal display elements in a wide variety of devices such as mobile telephones, personal digital assistants, pocket pagers, navigation systems, vehicle mounted liquid crystal displays, liquid crystal monitors, light modulation panels, office automation equipment displays and audio visual equipment displays, as well as electroluminescence displays or touch panels. This type of optical film can also be used as the wave plate within recording and/or playback devices for optical disks such as CD, CD-R, MD, magnetooptic and DVD disks.

What is claimed is:

1. An optical film comprising at least one resin-layer comprising a thermoplastic norbornene resin formed of a polymer comprising:
   a structural unit represented by a general formula (1) shown below,

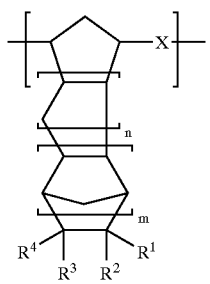

(1)

wherein.

n represents either one of 0 and 1, m represents either on of 0, and an integer of at least 1;

X represents either one of a group represented by the formula —CH=CH— and a group represented by the formula —CH$_2$CH$_2$—;

$R^1$, $R^2$, $R^3$, and $R^4$ each represent, independently, any one of a hydrogen atom, a halogen atom, a substituted or unsubstituted hydrocarbon group of 1 to 30 carbon atoms which may contain a linkage group incorporating an oxygen atom, a nitrogen atom, or a sulfur atom, and a polar group; or $R^1$ and $R^2$, or $R^3$ and $R^4$, or $R^2$ and $R^3$ may be bonded to each other to form a hydrocarbon ring or a heterocyclic ring, wherein said hydrocarbon ring or said heterocyclic ring may be either on of a separate stand-alone structure, or a polycyclic structure formed through condensation with another ring, and said formed hydrocarbon ring or said heterocyclic ring may be an aromatic ring or a non-aromatic ring, wherein within at least a portion of said structural units are incorporated within said polymer, either at least one of said groups $R^1$ to $R^4$ has a group represented by a general formula (2) shown below, or said groups $R^2$ and $R^3$ are bonded to each other to form at least one group selected from the general formulas (3) and (4) shown below:

wherein, p represents an integer of 1 to 5, and $R^5$ represents any one of a biphenyl group, an α or β naphthyl group, an anthracenyl group, and one of these groups in which a hydrogen atom has been substituted with a halogen atom or a hydrocarbon group of 1 to 10 carbon atoms,

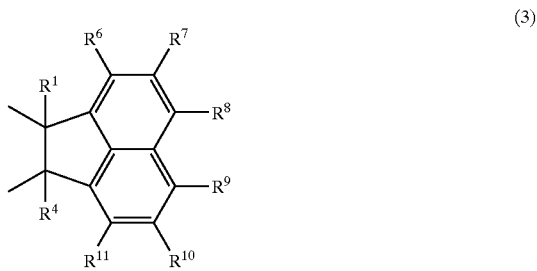

wherein, $R^1$ and $R^4$ represent identical meanings as defined above in relation to said general formula (1), and $R^6$ to $R^{11}$ each represent, independently, any one of a hydrogen atom; a halogen atom; a substituted or unsubstituted monovalent hydrocarbon group of 1 to 10 carbon atoms which may contain a linkage group incorporating an oxygen atom, a nitrogen atom, a sulfur atom or a silicon atom; and a monovalent polar group, and

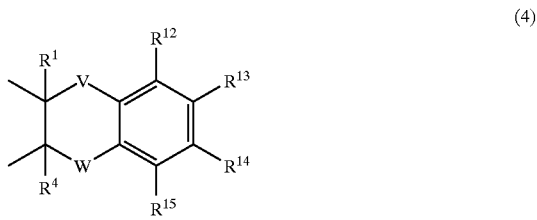

wherein, $R^1$ and $R^4$ represent identical meanings as defined above in relation to said general formula (1), and $R^{12}$ to $R^{15}$ each represent, independently, any one of a hydrogen atom; a halogen atom; a substituted or unsubstituted monovalent hydrocarbon group of 1 to 10 carbon atoms which may contain a linkage group incorporating an oxygen atom, a nitrogen atom, a sulfur atom or a silicon atom; and a monovalent polar group, V and W each represent, independently, either one of a single bond, and a bivalent group selected from a group consisting of —O—, —CO—, —NR$^{16}$—, —(CR$^{17}$R$^{18}$)q-wherein q=1 to 5, —COO— and —OCO—, and $R^{16}$ to $R^{18}$ each represent, independently, any one of a hydrogen atom, a halogen atom, and an aliphatic hydrocarbon group, an alicyclic hydrocarbon group and an aromatic hydrocarbon group of 1 to 10 carbon atoms,
a plurality of X's present in a molecule of said polymer being the same or different.

2. The optical film according to claim 1 which imparts retardation to transmitted light.

3. The optical film according to claim 2, wherein a ratio between a retardation Re(550) of transmitted light at a wavelength of 550 nm and a retardation Re(400) of transmitted light at a wavelength of 400 nm, namely a ratio Re(400)IRe(550), falls within a range from 1.5 to 1.0, and a ratio between said retardation Re(550) and a retardation Re(800) of transmitted light at a wavelength of 800 nm, namely a ratio Re(800)IRe(550), falls within a range from 1.0 to 0.5.

4. The optical film according to claim 2, wherein in an index ellipsoid in which an in-plane direction of said optical film at which an index of refraction is largest is labeled an x axis, an in-plane direction orthogonal to said x axis is labeled a y axis, a direction through a thickness of said optical film perpendicular to a plane of said optical film is labeled a z axis, and corresponding indexes of refraction are labeled Nx, Ny and Nz respectively, a degree of refractive index anisotropy, represented by a formula (Nx+Ny)/2−Nz, is within ±0.1.

5. The optical film according to claim 2, comprising at least two said resin-layers laminated together, each of the layers imparting retardation to transmitted light, wherein a value represented by a formula:

Re(λ)/λ wherein, λ represents a wavelength of transmitted light from said film, and Re(λ) represents retardation at the wavelength λ,
varies over an entire wavelength range from 400 to 800 nm within ±20% of the average value.

6. A polarizing plate comprising an optical film according to claim 1.

7. The polarizing plate according to claim 6, wherein said optical film is present as protective film formed on at least one surface of a substrate of said plate.

8. The polarizing plate according to claim 6, wherein said optical film is present as the substrate of said plate.

9. A method for production of an optical film as defined in claim 1, comprising a step for casting an organic solvent solution containing a thermoplastic norbornene resin stated in claim 1.

10. The method according to claim 9, wherein said organic solvent is a mixed solvent of a good solvent and a poor solvent for said thermoplastic norbornene resin.

11. The optical film according to claim 1, wherein in said general formula (1) representing the structural unit a, n=0 and m=1.

12. The optical film according to claim 1, with a light diffusing function on at least one surface thereof.

13. The optical film according to claim 1, with a transparent conductive layer on at least one surface thereof.

14. The optical film according to claim 1, with an antireflective layer on at least one surface thereof.

15. The optical film according to claim 1, wherein the proportion of the structural unit a is from 100 to 5% by weight of said polymer.

16. The optical film according to claim 1, wherein said polymer additionally comprises a structural unit d represented by a general formula (10) shown below,

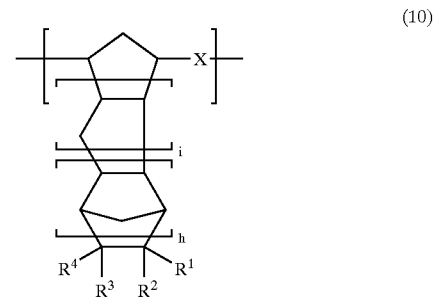

(10)

wherein, h represents 0 or an integer of 1 or greater, i represents 0 or 1; and X, $R^1$, $R^2$, $R^3$ and $R^4$ represent the same meanings as defined in relation to said general formula (1), although cases in which said groups $R^1$ to $R^4$ represent a group represented by said general formula (2), or said groups $R^2$ and $R^3$ are bonded to each other to form at least one group selected from said general formulas (3) and (4) are excluded,
wherein at least one of said groups $R^1$ and $R^4$ represents a polar group.

17. The optical film according to claim 1, wherein said polymer additionally comprises a structural unit d represented by a general formula (10) shown below,

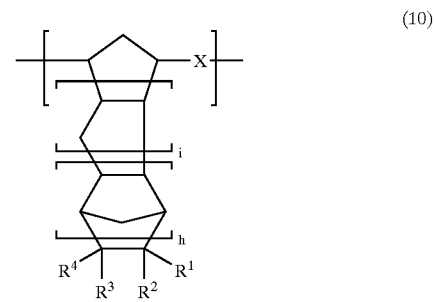

(10)

wherein, h represents 0 or an integer of 1 or greater, i represents 0 or 1; and X, $R^1$, $R^2$, $R^3$ and $R^4$ represent the same meanings as defined in relation to said general formula (1), although cases in which said groups $R^1$ to $R^4$ represent a group represented by said general formula (2), or said groups $R^2$ and $R^3$ are bonded to each other to form at least one group selected from said general formulas (3) and (4) are excluded,
wherein at least one of said groups $R^1$ to $R^4$ is a polar group represented by a general formula (9):

—(CH$_2$)$_z$COOR$^{19}$ wherein z is from 0 to 5, and $R^{19}$ is a monovalent organic group.

* * * * *